(12) United States Patent
Dabral et al.

(10) Patent No.: US 11,592,154 B2
(45) Date of Patent: Feb. 28, 2023

(54) METHODS AND APPARATUS FOR MULTI-SEGMENT ILLUMINATION OF SPATIAL LIGHT MODULATORS

(71) Applicant: Texas Instruments Incorporated, Dallas, TX (US)

(72) Inventors: Shashank Dabral, Allen, TX (US); Gavin Perrella, Dallas, TX (US); Akeem Whitehead, Garland, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/565,688

(22) Filed: Dec. 30, 2021

(65) Prior Publication Data

US 2023/0008219 A1    Jan. 12, 2023

Related U.S. Application Data

(60) Provisional application No. 63/220,581, filed on Jul. 12, 2021.

(51) Int. Cl.
*B60Q 1/14* (2006.01)
*H05B 45/30* (2020.01)
*H05B 45/325* (2020.01)
*F21S 41/65* (2018.01)
*F21S 41/675* (2018.01)

(52) U.S. Cl.
CPC ............ *F21S 41/65* (2018.01); *B60Q 1/1423* (2013.01); *F21S 41/675* (2018.01); *H05B 45/325* (2020.01); *B60Q 2300/05* (2013.01)

(58) Field of Classification Search
CPC ........ H05B 45/10; H05B 5/30; H05B 45/325; B60Q 1/14; B60Q 1/1423; B60Q 2300/05; F21S 41/65; F21S 41/675
See application file for complete search history.

(56) References Cited

U.S. PATENT DOCUMENTS

| 9,855,887 | B1 * | 1/2018 | Potter | F21S 41/675 |
| 2010/0007292 | A1 * | 1/2010 | Horino | H05B 45/20 |
| | | | | 315/312 |
| 2016/0377252 | A1 * | 12/2016 | Bhakta | F21V 23/003 |
| | | | | 362/520 |
| 2021/0178960 | A1 * | 6/2021 | Fenske | F21S 41/265 |

* cited by examiner

*Primary Examiner* — Thai Pham
(74) *Attorney, Agent, or Firm* — Michelle F. Murray; Frank D. Cimino

(57) ABSTRACT

An example headlight includes: a multi-segment illumination source comprising: a first illumination source segment; and a second illumination source segment; driver circuitry coupled to the multi-segment illumination source, the driver circuitry comprising: a first driver coupled to the first illumination source segment, the first driver configured to generate a first drive signal to cause the first illumination source segment to produce a first light having a first brightness; and a second driver coupled to the second illumination source segment, the second driver configured to generate a second drive signal to cause the second illumination source segment to produce a second light having a second brightness; and a spatial light modulator (SLM) optically coupled to the multi-segment illumination source, the SLM configured to: receive the first light; modulate the first light to produce first modulated light; receive the second light; and modulate the second light to produce second modulated light.

20 Claims, 9 Drawing Sheets

| LED DRIVE CURRENT (A) | DUTY CYCLE (%) | ILLUMINATION (LUMENS) | COLOR TEMPERATURE (K) |
|---|---|---|---|
| 3 | 10 | 630 | 5440 |
| 3 | 30 | 1270 | 5610 |
| 3 | 60 | 2190 | 6490 |
| 3 | 80 | 2810 | 6490 |
| 3 | 100 | 3300 | 6490 |

FIG. 6A

| LED DRIVE CURRENT (A) | DUTY CYCLE (%) | ILLUMINATION (LUMENS) | COLOR TEMPERATURE (K) |
|---|---|---|---|
| 1.0 | 100 | 610 | 5430 |
| 1.5 | 100 | 1360 | 5430 |
| 2.0 | 100 | 2290 | 5440 |
| 2.5 | 100 | 2870 | 6290 |
| 3.0 | 100 | 3300 | 6490 |

FIG. 6B

| | LEFT | CENTER | RIGHT | TOTAL |
|---|---|---|---|---|
| CURRENT DENSITY (A/mm^2) | 3 | 3 | 3 | N/A |
| POWER (W) | 16.3 | 16.3 | 16.3 | 48.9 |
| LUMENS | 975 | 975 | 975 | 2925 |
| 2023 LUMENS | 1170 | 1170 | 1170 | 3510 |

| | LEFT | CENTER | RIGHT | TOTAL |
|---|---|---|---|---|
| CURRENT DENSITY (A/mm^2) | 1 | 5 | 1 | N/A |
| POWER (W) | 4.8 | 29.6 | 4.8 | 35.2 |
| LUMENS | 514 | 1120 | 514 | 2148 |
| 2023 LUMENS | 617 | 1344 | 617 | 2578 |

| | LEFT | CENTER | RIGHT | TOTAL |
|---|---|---|---|---|
| CURRENT DENSITY (A/mm^2) | 1 | 1 | 5 | N/A |
| POWER (W) | 4.8 | 4.8 | 29.6 | 35.2 |
| LUMENS | 514 | 514 | 1120 | 2148 |
| 2023 LUMENS | 617 | 617 | 1344 | 2578 |

METHODS AND APPARATUS FOR MULTI-SEGMENT ILLUMINATION OF SPATIAL LIGHT MODULATORS

CROSS-REFERENCE TO RELATED APPLICATION

This patent application claims the benefit of and priority to U.S. Provisional Patent Application Ser. No. 63/220,581 filed Jul. 12, 2021, which is hereby incorporated herein by reference in its entirety.

TECHNICAL FIELD

This description relates generally to illumination of spatial light modulators, and more particularly to methods and apparatus for multi-segment illumination of spatial light modulators.

BACKGROUND

Vehicle headlights are becoming increasingly complex as new electronic systems, such as spatial light modulators (SLM), are being implemented. SLMs are commonly used to accurately modify and project light, which has led SLM technologies to become a popular method of light projection.

SUMMARY

For methods and apparatus for multi-segment illumination of spatial light modulators, an example headlight includes a multi-segment illumination source comprising: a first illumination source segment; and a second illumination source segment; driver circuitry coupled to the multi-segment illumination source, the driver circuitry comprising: a first driver coupled to the first illumination source segment, the first driver configured to generate a first drive signal to cause the first illumination source segment to produce a first light having a first brightness; and a second driver coupled to the second illumination source segment, the second driver configured to generate a second drive signal to cause the second illumination source segment to produce a second light having a second brightness; and a spatial light modulator (SLM) optically coupled to the multi-segment illumination source, the SLM configured to: receive the first light; modulate the first light to produce first modulated light; receive the second light; and modulate the second light to produce second modulated light.

BRIEF DESCRIPTION OF THE DRAWINGS

FIG. 6A is a table of an example operation of the driver circuitry of FIG. 3 configured to illustrate the illumination and color temperature of the multi-segment illumination sources of FIGS. 2A-2D based on a duty cycle.

FIG. 6B is a table of an example operation of the driver circuitry of FIG. 3 configured to illustrate the illumination and color temperature of the multi-segment illumination sources of FIGS. 2A-2D based on a current being supplied.

The same reference numbers or other reference designators are used in the drawings to designate the same or similar (functionally and/or structurally) features.

DETAILED DESCRIPTION

Figure 1:
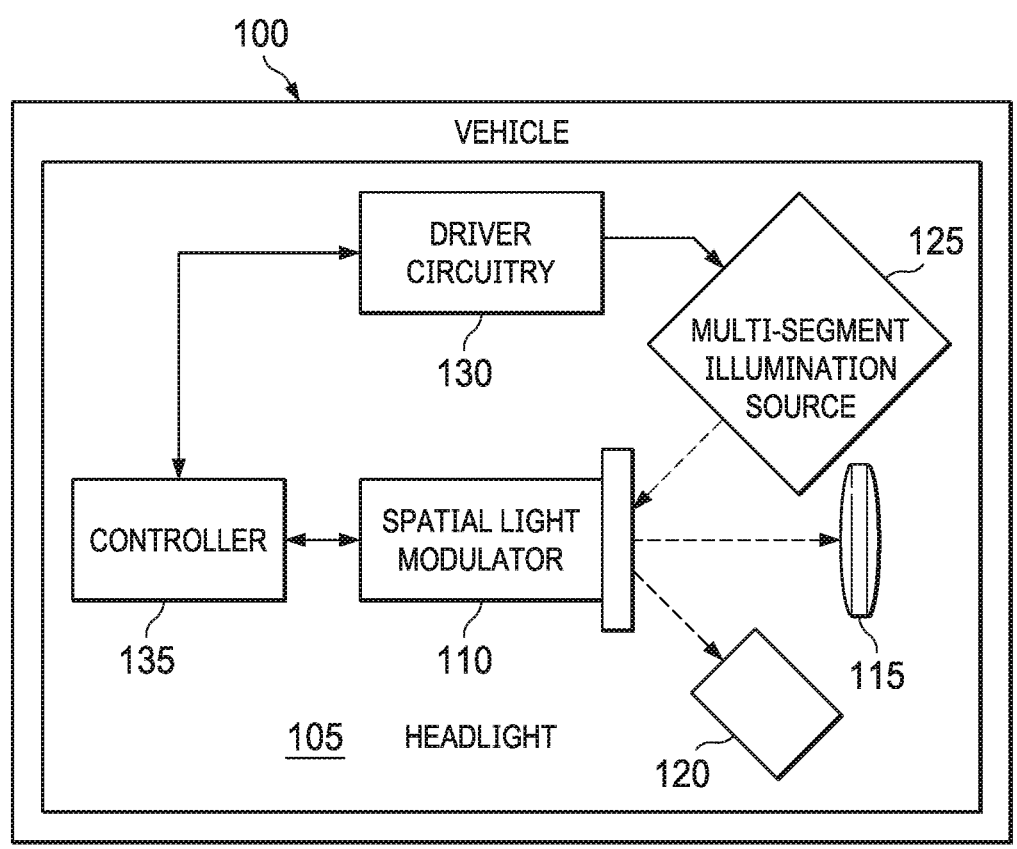
FIG. 1 is a schematic diagram of an example vehicle including an example headlight and an example spatial light modulator.

The drawings are not necessarily to scale. Generally, the same reference numbers in the drawing(s) and this description refer to the same or like parts. Although the drawings show layers and regions with clean lines and boundaries, some or all of these lines and/or boundaries may be idealized. In reality, the boundaries and/or lines may be unobservable, blended and/or irregular.

Automotive vehicles (e.g., cars, all-terrain vehicles (ATVs), industrial motor vehicles, sedans, sport utility vehicles (SUVs), trucks, vans, etc.), such as internal combustion engine vehicles, hybrid-electric vehicles (HEVs), electric vehicles (EVs), etc., may benefit from beam steering headlights to control the intensity and temperature of light being projected from the headlights. For example, a beam steering headlight may adjust the brightness of a portion of the area illuminated by the beam steering headlight to operate in a high beam mode. Beam steering headlights may be illuminate based on an intended projection An example beam steering headlight may include a spatial light modulator (SLM) (e.g., a digital micromirror device) optically coupled to an illumination source, such that the SLM may be used to reflect different portions of the light supplied by the illumination source. For example, a beam steering headlight includes an SLM to reflect portions of light away from a field of view of the beam steering headlight, such that the portions of light do not illuminate a corresponding portion of the field of view of the beam steering headlight. An SLM may modulate light away from the field of view to generate portions of the field of view that are not illuminated, which decreases the efficiency of the SLM application. In some applications, such as vehicle headlights, the inclusion of an SLM decreases the overall efficiency, increases the cost, and increases integration complexity of such vehicle headlights, which may limit the application of SLM technologies.

Examples described herein include headlights which include a multi-segment illumination source optically coupled to an SLM to increase the efficiency and control of light being projected by the headlight. The multi-segment illumination source includes a plurality of illumination sources, which may be referred to as segments, to illuminate different portions of the SLM based on driver circuitry. In some described examples, the multi-segment illumination source includes driver circuitry electrically coupled to a plurality of segments of the multi-segment illumination source to decrease integration complexity. For example, a beam steering headlight may use the same driver circuitry to control one or more light emitting diode (LED) segments comprising a multi-segment illumination source. The driver circuitry may disable one or more segments included in the multi-segment illumination source, such that the SLM does not need to reflect light away from the field of view of the headlight.

In some described examples, the brightness and color temperature of each segment included in the multi-segment illumination source may be controlled using a pulse width modulation (PWM) signal. For example, a first LED segment operating at 3 amps with a 100 percent duty cycle segment has approximately the same color temperature as a second LED segment operating at 3 amps with a 60 percent duty cycle. In such an example, the first LED segment would be brighter than the second LED segment as a result of a lower current density, however both segments would have the same color temperature. The headlight described herein is a beam steering headlight that allows for portions of the field of view of the beam steering headlight to be efficiently illuminated to different intensities without altering the color temperature.

FIG. 1 is a schematic diagram of an example vehicle 100 including an example headlight 105. In the example of FIG. 1, the vehicle 100 may include a plurality of headlights, such that the headlight 105 is a first headlight and the vehicle 100 further including a second headlight (not illustrated) configured similar to the headlight 105. In the example of FIG. 1, the vehicle 100 may be an internal combustion engine vehicle (e.g., an ATV, an industrial motor vehicle, a sedan, an SUV, a truck, a van, etc.), an HEV, an electric vehicle, etc. The vehicle 100 may include additional components (not illustrated). The headlight 105 includes an example spatial light modulator 110, an example projection optics 115, an example heat sink 120, an example multi-segment illumination source 125, example driver circuitry 130, and an example controller 135. The headlight 105 may supply light from the multi-segment illumination source 125 to the projection optics 115 based on the spatial light modulator 110.

In the example of FIG. 1, the spatial light modulator 110 is optically coupled to the projection optics 115, to the heat sink 120, and to the multi-segment illumination source 125. The spatial light modulator 110 is an advanced light control technology which uses spatial light modulation to increase the versatility of light patterns, such that the SLM 110 may supply modulated light. The spatial light modulator 110 may be a digital micromirror device (DMD) which uses mirrors to reflect light towards an optical output (e.g., the projection optics 115) to generate illuminated portions of a field of view. The spatial light modulator 110 is electrically coupled to the controller 135. The spatial light modulator 110 may reflect light received from the multi-segment illumination source 125. The spatial light modulator 110 may supply light to either the projection optics 115 or the heat sink 120. For example, the spatial light modulator 110 illuminates the field of view of the headlight 105 as a result of the spatial light modulator 110 reflecting light from the multi-segment illumination source 125 to the projection optics 115. Alternatively, the spatial light modulator 110 may not illuminate a portion of the field of view as a result of reflecting the portion of the light corresponding to the portion of the field of view to the heat sink 120.

The projection optics 115 is optically coupled to the spatial light modulator 110. The projection optics 115 include a headlight cover, such that the light from the spatial light modulator 110 may illuminate an intended field of view. The projection optics 115 may project light supplied by the spatial light modulator 110. The projection optics 115 determines a field of view of the headlight 105, such that modifying the projection optics 115 may alter the field of view of the headlight 105. The field of view is the area in which the headlight 105 may illuminate using the spatial light modulator 110. The projection optics 115 may include at least one lens, transparent plastic, transparent glass, projection lens, etc.

The heat sink 120 is optically coupled to the spatial light modulator 110. The heat sink 120 receives light reflected by the spatial light modulator 110, such that the light projected to the heat sink 120 is not supplied to the projection optics 115. The heat sink 120 safely dissipates the light supplied by the spatial light modulator 110 to the heat sink 120, such that any energy (e.g., heat) produced by the light may be safely dissipated. The heat sink 120 may be a portion of the headlight 105 and/or vehicle 100 capable of dissipating heat, such as a piece of metal included in the vehicle 100, wherein the surface area in contact with the light is enough to dissipate the light reflected towards the heat sink 120. Alternatively, the heat sink 120 may be manufactured out of a metal or another material with a high thermal resistance, such that any heat generated by the light may be dissipated without effecting the operation of the headlight 105.

The multi-segment illumination source 125 is optically coupled to the spatial light modulator 110. The multi-segment illumination source 125 is electrically coupled to the driver circuitry 130. The multi-segment illumination source 125 includes a plurality of LED segments. The multi-segment illumination source 125 may be controlled by the driver circuitry 130, such that the individual segments may be individually controlled. For example, the multi-segment illumination source 125 may include three LED segments, such that the one or more of the LED segments may be enabled. Alternatively, the multi-segment illumination source 125 may be include segments such as an organic light emitting diode (OLED), a liquid crystal display (LCD), a cathode ray tube (CRT) display, an in-place switching (IPS) display, etc.

The driver circuitry 130 is electrically coupled between the multi-segment illumination source 125 and the controller 135. The driver circuitry 130 may supply power to the multi-segment illumination source 125. The driver circuitry 130 individually controls each segment of the multi-segment illumination source 125. For example, the driver circuitry 130 may include three drivers to support a multi-segment illumination source 125 comprised of three segments. Alternatively, the driver circuitry 130 may have one or more drivers control one or more segments of the multi-segment illumination source 125, such that integration complexity and cost are decreased.

The controller 135 is electrically coupled to the spatial light modulator 110 and to the driver circuitry 130. The controller 135 controls the spatial light modulator 110. For example, the controller 135 may configure the spatial light modulator 110 to reflect half of the light supplied by a segment of the multi-segment illumination source 125 towards the heat sink 120 to generate an area with a reduced illumination. The controller 135 is configured to control the driver circuitry 130. For example, the controller 135 may enable a driver corresponding to a single segment of the multi-segment illumination source 125 to illuminate a portion of the spatial light modulator 110. In such an example, the controller 135 can provide a pulse width modulated (PWM) signal to the driver circuitry 130, such that the illumination of an enabled segment of the multi-segment illumination source 125 is reduced without effecting the color temperature of the light.

In example operation, the controller 135 may enable the driver circuitry 130 to supply power to the multi-segment illumination source 125, such that some segments comprising the multi-segment illumination source 125 are enabled. The controller 135 may control the color temperature and illumination intensity based on a duty cycle of one or more PWM signals electrically coupled to the driver circuitry 130. The controller 135 sets the spatial light modulator 110 to reflect light from the multi-segment illumination source 125. The spatial light modulator 110 may reflect the light supplied by the multi-segment illumination source 125, such that the light is provided to the projection optics 115 and/or the heat sink 120. The spatial light modulator 110 may reflect portions of the light supplied by the multi-segment illumination source 125 to increase or decrease the illumination of the field of view of the projection optics 115.

Advantageously, the power consumption of the headlight 105 is decreased as a result of the segments of the multi-segment illumination source 125 being individually controlled by the driver circuitry 130. Advantageously, the light supplied to the projection optics 115 by the spatial light modulator 110 corresponds to portions of the field of view, such that the illumination of individual portions of the field of view is achieved.

Figure 2A:
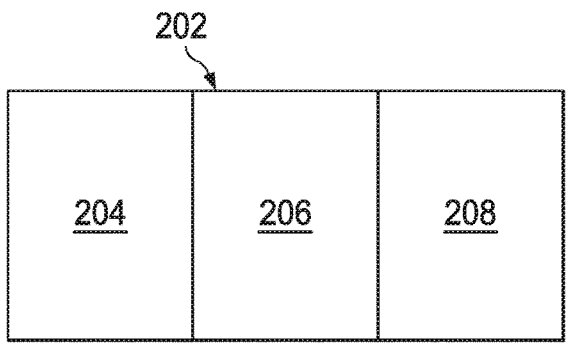
FIG. 2A is an illustration of an example first multi-segment illumination source configured to illuminate the spatial light modulator of FIG. 1.

FIG. 2A is an illustration of an example first multi-segment illumination source 202 configured for use in the headlight 105 of FIG. 1. The first multi-segment illumination source 202 is an example of multi-segment illumination source 125 illustrated in FIG. 1. In the example of FIG. 2A, the first multi-segment illumination source 202 includes an example first segment 204, a second segment 206, and a third segment 208. The first multi-segment illumination source 202 may be electrically coupled to the driver circuitry 130 of FIG. 1. The field of view of the headlight 105 is corresponds to the area wherein the spatial light modulator 110 may illuminate based on the light supplied by the multi-segment illumination source 125. The first multi-segment illumination source 202 divides the field of view of the headlight 105 into three vertical segments. The segments 204-208 each represent a third of the field of view of the headlight 105, such that the width of the field of view is divided into three equal portions each corresponding to one of the segments 204-208. The first multi-segment illumination source 202 may supply light to the spatial light modulator 110 of FIG. 1 as a result of one or more of the segments 204-208 being enabled. Advantageously, the first multi-segment illumination source 202 can increase the efficiency of the headlight 105 by disabling one or more of the segments 204-208 corresponding to a portion of the field of view not being illuminated. For example, the first multi-segment illumination source 202 may disable the first segment 204 when projecting an image onto the corresponding vertical portion of a road, within the field of view, to increase the visibility of the image projected onto the road by the headlight 105. Alternatively, the first multi-segment illumination source 202 may be configured to include more than three segments, such that the first multi-segment illumination source 202 may include more than three vertical segments, for example four vertical segments, or fewer than three vertical segments, for example two vertical segments.

The segments 204-208 contain a plurality of LEDs (not illustrated). Alternatively, the segments 204-208 may be referred to as an LED array, LED matrix, etc. The first segment 204 corresponds to a vertical third of the field of view on the left most side of the first multi-segment illumination source 202. The second segment 206 corresponds to a vertical third of the field of view in the center of the first multi-segment illumination source 202, such that the first segment 204 is on the left side of the second segment 206. The third segment 208 corresponds to a vertical third of the field of view on the right most side of the first multi-segment illumination source 202, such that the third segment 208 is on the right side of the second segment 206.

The segments 204-208 are configured to be electrically coupled to the driver circuitry 130, such that the color temperature and intensity may be controlled for the corresponding portion of the field of view. For example, the controller 135 may supply a plurality of pulse width modulated (PWM) signals to the driver circuitry 130 to enable the color temperature and intensity of the segments 204-208 to be individually controlled based on a duty cycle of the PWM signal provided to the driver circuitry 130 for each of the segments 202-208. Advantageously, the efficiency of the headlight 105 is increased as a result of the segments 202-208 being able to be disabled when the corresponding portion of the field of view is not illuminated.

Figure 2B:
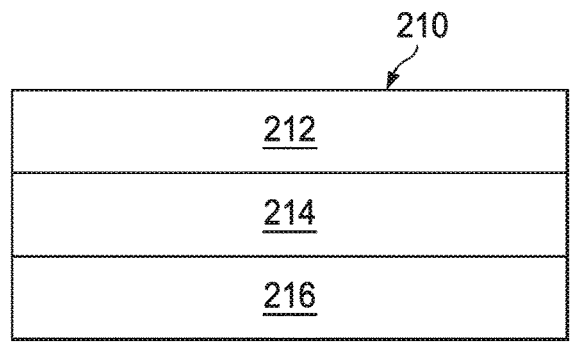
FIG. 2B is an illustration of an example second multi-segment illumination source configured to illuminate the spatial light modulator of FIG. 1.

FIG. 2B is an illustration of an example second multi-segment illumination source 210 configured for use in the headlight 105 of FIG. 1. The second multi-segment illumination source 210 is an example of multi-segment illumination source 125 illustrated in FIG. 1. In the example of FIG. 2B, the second multi-segment illumination source 210 includes a first segment 212, a second segment 214, and a third segment 216. The second multi-segment illumination source 210 may be electrically coupled to the driver circuitry 130 of FIG. 1. The field of view of the headlight 105 is corresponds to the area wherein the spatial light modulator 110 may illuminate based on the light supplied by the multi-segment illumination source 125. The second multi-segment illumination source 210 is configured to divide the field of view of the headlight 105 into three horizontal segments as a result of dividing the second multi-segment illumination source 210 into three equal segments. The second multi-segment illumination source 210 is configured to supply light to the spatial light modulator 110 in three horizontal portions corresponding to a horizontal portion of the field of view, such that a height of the second multi-segment illumination source 202 is divided into three equal portions each corresponding to one of the segments 212-216. The second multi-segment illumination source 210 may supply light to the spatial light modulator 110 of FIG. 1 as a result of one or more of the segments 212-216 being enabled. Advantageously, the second multi-segment illumination source 210 can increase the efficiency of the headlight 105 by disabling one or more of the segments 212-216 corresponding to a portion of the field of view not being illuminated. For example, the first segment 212 may be disabled by the driver circuitry 130 during low beam operation of the headlight 105, such that the headlight 105 illuminates only the bottom two thirds of the field of view. Alternatively, the second multi-segment illumination source 210 may be configured to include more than three horizontal segments, such that the second multi-segment illumination source 210 may include more than three horizontal segments, for example four horizontal segments, or fewer than three horizontal segments, for example two segments.

The segments 212-216 contain a plurality of LEDs (not illustrated). Alternatively, the segments 212-216 may be referred to as an LED array, LED matrix, etc. The first segment 212 corresponds to a horizontal third of the field of view on the top of the second multi-segment illumination source 210. The second segment 214 corresponds to a horizontal third of the field of view in the center of the second multi-segment illumination source 210, such that the first segment 212 is above the second segment 214. The third segment 216 corresponds to a horizontal third of the field of view on the bottom of the second multi-segment illumination source 210, such that the third segment 216 is below the second segment 214.

The segments 212-216 are configured to be electrically coupled to the driver circuitry 130, such that the color temperature and intensity may be controlled for the corresponding portion of the field of view. Advantageously, the efficiency of the headlight 105 is increased as a result of the segments 212-216 being able to be disabled when the corresponding portion of the field of view is not illuminated.

Figure 2C:
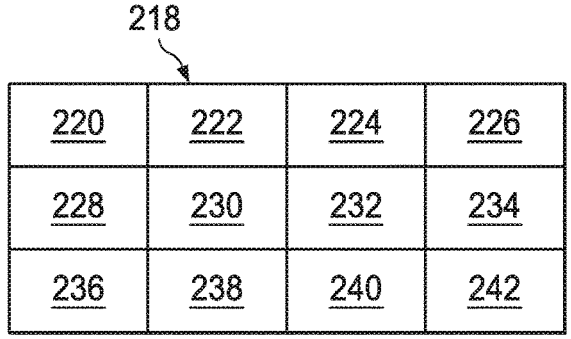
FIG. 2C is an illustration of an example third multi-segment illumination source configured to illuminate the spatial light modulator of FIG. 1.

FIG. 2C is a first illustration of a third multi-segment illumination source 218 configured for use in the headlight 105 of FIG. 1. The third multi-segment illumination source 218 is an example of multi-segment illumination source 125 illustrated in FIG. 1. In the example of FIG. 2C, the third multi-segment illumination source 218 includes a first segment 220, a second segment 222, a third segment 224, a fourth segment 226, a fifth segment 228, a sixth segment 230, a seventh segment 232, an eighth segment 234, a ninth segment 236, a tenth segment 238, an eleventh segment 240, and a twelfth segment 242. The third multi-segment illumination source 218 may be electrically coupled to the driver circuitry 130 of FIG. 1. The third multi-segment illumination source 218 is configured to divide the field of view of the headlight 105 into twelve equally sized segments, such that the horizontal length of the third multi-segment illumination source 218 is divided into 4 equal parts and the vertical length of the third multi-segment illumination source 218 is divided into three equal parts. The third multi-segment illumination source 218 may supply light to the spatial light modulator 110 of FIG. 1 as a result of one or more of the segments 220-242 being enabled. Advantageously, the third multi-segment illumination source 218 can increase the efficiency of the headlight 105 by disabling one or more of the segments 220-242 corresponding to a portion of the field of view not being illuminated. Alternatively, the third multi-segment illumination source 218 may be configured to include a plurality of segments, such that the third multi-segment illumination source 218 is comprised of a plurality of segments.

The segments 220-242 are comprised of a plurality of LEDs (not illustrated). Alternatively, the segments 220-242 may be referred to as an LED array, LED matrix, etc. The first segment 220 corresponds to a twelfth of the field of view in the top left of the third multi-segment illumination source 218. The second segment 222 corresponds to a twelfth of the field of view to the right of the first segment 220 on the top of the third multi-segment illumination source 218, such that the first segment 220 is horizontal to the second segment 222. The third segment 224 corresponds to a twelfth of the field of view to the right of the second segment 222 on top of the third multi-segment illumination source 218, such that the third segment 224 is horizontal to the second segment 222. The fourth segment 226 corresponds to a twelfth of the field of view to the right of the third segment 224 on the top of the third multi-segment illumination source 218, such that the third segment 224 is horizontal to the fourth segment 226. The fifth segment 228 corresponds to a twelfth of the field of view vertically below the first segment 220. The sixth segment 230 corresponds to a twelfth of the field of view to the right of the fifth segment 228 and below the second segment 222, such that the fifth segment 228 is horizontal to the sixth segment 230. The seventh segment 232 corresponds to a twelfth of the field of view to the right of the sixth segment 230 and below the third segment 224, such that the seventh segment 232 is horizontal to the sixth segment 230. The eighth segment 234 corresponds to a twelfth of the field of view to the right of the seventh segment 232 and below the fourth segment 226, such that the seventh segment 232 is horizontal to the eighth segment 234. The ninth segment 236 corresponds to a twelfth of the field of view vertically below the fifth segment 228. The tenth segment 238 corresponds to a twelfth of the field of view to the right of the ninth segment 236 and below the sixth segment 230, such that the ninth segment 236 is horizontal to the tenth segment 238. The eleventh segment 240 corresponds to a twelfth of the field of view to the right of the tenth segment 238 and below the seventh segment 232, such that the eleventh segment 240 is horizontal to the tenth segment 238. The twelfth segment 242 corresponds to a twelfth of the field of view to the right of the eleventh segment 240 and below the eighth segment 234, such that the eleventh segment 240 is horizontal to the twelfth segment 242.

The segments 220-242 are configured to be electrically coupled to the driver circuitry 130, such that the color temperature and intensity may be controlled for the corresponding portion of the field of view. Advantageously, the efficiency of the headlight 105 is increased as a result of the segments 220-242 being able to be disabled when the corresponding portion of the field of view is not illuminated.

Figure 2D:
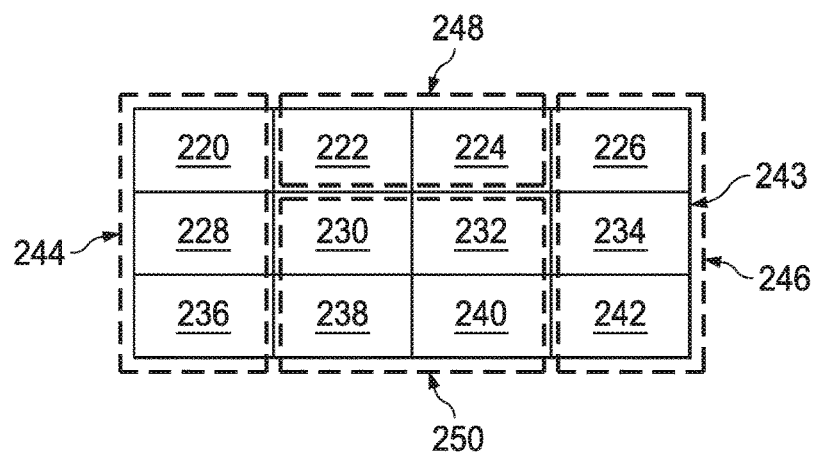
FIG. 2D is an illustration of the third multi-segment illumination source of FIG. 2C showing grouped segments.

FIG. 2D is a second illustration of the fourth multi-segment illumination source 243. The fourth multi-segment illumination source 243 is an example of multi-segment illumination source 125 illustrated in FIG. 1. In the fourth multi-segment illumination source 243, some of the segments are grouped together. In the example of FIG. 2D, the fourth multi-segment illumination source 243 includes the first segment 220, the second segment 222, the third segment 224, the fourth segment 226, the fifth segment 228, the sixth segment 230, the seventh segment 232, the eighth segment 234, the ninth segment 236, the tenth segment 238, the eleventh segment 240, the twelfth segment 242, an example first region 244, a second region 246, a third region 248, and a fourth region 250.

In the example of FIG. 2D, the first region 244 includes the segments 220, 228, and 236. The first region 244 corresponds to a vertical third of the field of view on the left side of the fourth multi-segment illumination source 243, such that the first region 244 may be a left vertical segment. The second region 246 includes the segments 226, 234, and 242. The second region 246 corresponds to a vertical quarter of the field of view on the right side of the fourth multi-segment illumination source 243, such that the second region 246 may be a right vertical segment. The third region 248 includes the segments 222 and 224. The third region 248 corresponds to a horizontal third of the field of view between the regions 244 and 246 and on the top of the fourth multi-segment illumination source 243, such that the third region 248 may be a top center horizontal segment. The fourth region 250 includes the segments 230, 232, 238, and 240. The fourth region 250 corresponds to a third of the field of view between the regions 244 and 246 and on the top of the fourth multi-segment illumination source 243, such that the fourth region 250 may be a bottom center horizontal segment.

The regions 244-250 are coupled to the driver circuitry 130, such that the color temperature and intensity of the individual segments comprising the region may be controlled by a single driver. In example operation, the fourth multi-segment illumination source 243 may be configured for low beam operation by enabling the regions 244, 246, and 250, such that the regions 244 and 246 are supplied a current density of approximately 1 amp (A) and the fourth region 250 is supplied a current density of approximately four amps (A). Advantageously, low beam operation enables the lower and side regions of the field of view to be illuminated more than the top portion, such that oncoming traffic may be illuminated less than the rest of the field of view. In example operation, the fourth multi-segment illumination source 243 may be configured for beam steering operation, wherein the left portion of the field of view is illuminated at a lower intensity than the right portion as a result of the first region 244 being supplied a current density approximately equal to one amp (A), the second region 246 being supplied a current density approximately equal to five amps (A), and the regions 248 and 250 being supplied a current density approximately equal to three amps (A). Advantageously, beam steering operation of the headlight 105 enables a portion of the field of view to be illuminated more than other portions, such that an image may be projected in the portions with reduced illumination. In example operation, the fourth multi-segment illumination source 243 may be configured for high beam operation as a result of the regions 244 and 246 being supplied one amp (A), the third region 248 being supplied a current density of approximately three amps (A), and the fourth region 250 being supplied a current density approximately five amps (A). Advantageously, high beam operation of the headlight 105 enables the regions 248 and 250 to be illuminated more than the regions 244 and 246, such that the middle portion of the field of view may illuminate more of a road. Advantageously, the regions 244-250 reduces the number of individual drivers and reduces integration complexity.

Figure 3:
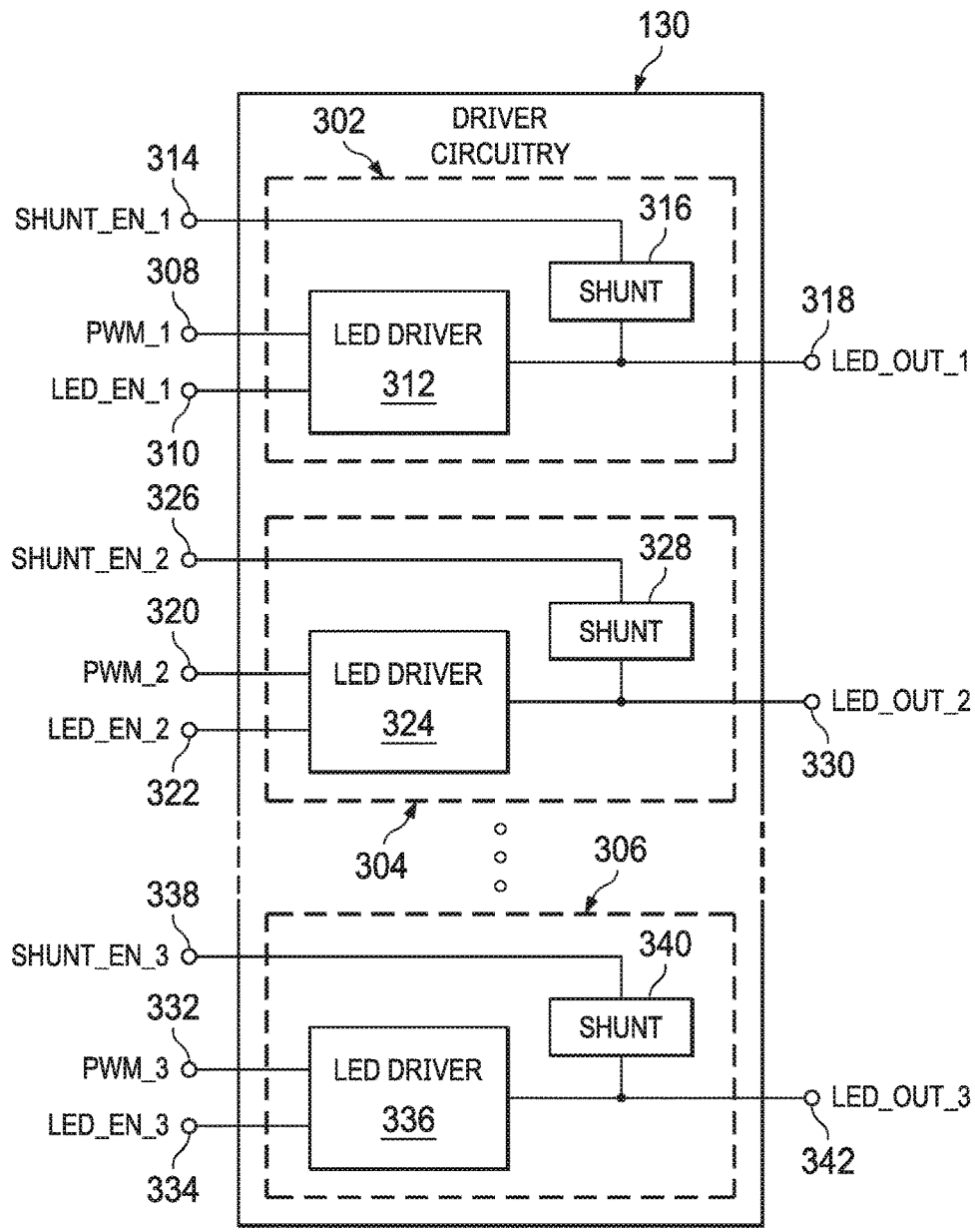
FIG. 3 is a schematic diagram of example driver circuitry configured to control the multi-segment illumination sources of FIGS. 2A-2D.

FIG. 3 is a schematic diagram of the driver circuitry 130 of FIG. 1 configured to control the first multi-segment illumination source 202 of FIG. 2A. In the example of FIG. 3, the driver circuitry 130 includes an example first driver 302, a second driver 304, and a third driver 306. Alternatively, the driver circuitry 130 may include fewer than three drivers or more than three drivers. Alternatively, the driver circuitry 130 may be configured to control a plurality of segments and/or regions comprising a multi-segment illumination source. For example, the fourth multi-segment illumination source 243 may be configured to be controlled by four drivers, such that there is one driver for each of the regions 244-250. In such an example, the fourth multi-segment illumination source 243 may be configured to be controlled by twelve drivers, such that each of the segments 220-242 are individually controlled. Advantageously, the integration complexity of the headlight 105 is decreased as a result of the driver circuitry 130 being configured to include a plurality of drivers control a region (e.g., the regions 244-250). The driver circuitry 130 may be configured to include a plurality of drivers corresponding to the number of segments and/or regions of a multi-segment illumination source.

In the example of FIG. 3, the first driver 302 includes an example first pulse width modulation terminal (PWM_1) 308, an example first light emitting diode enable terminal (LED_EN_1) 310, an example first LED driver 312, an example first shunt enable terminal (SHUNT_EN_1) 314, an example first shunt 316, and an example first LED output terminal (LED_OUT_1) 318. The first driver 302 is configured to supply power to one or more segments of a multi-segment illumination source (e.g., the first multi-segment illumination source 202 of FIG. 2A, the second multi-segment illumination source 210 of FIG. 2B, etc.) based on the terminals 308, 310, and 314.

The first LED driver 312 is electrically coupled to the first PWM terminal 308, the first LED enable terminal 310, the first shunt 316, and the first LED output terminal 318. The first PWM terminal 308 may be coupled to a PWM input supplied by the controller 135 of FIG. 1. An LED driver output of the first LED driver 312 is coupled to the first LED output terminal 318. The first LED driver 312 determines a magnitude of power to supply to the first LED output terminal 318 based on a duty cycle of the PWM signal electrically coupled to the first PWM terminal 308. For example, the first LED driver 312 may supply 50 percent of the maximum power output to the first LED output terminal 318 as a result of a 50 percent duty cycle on the first PWM terminal 308. The first LED driver 312 supplies power to the first LED output terminal 318 as a result of the first LED enable terminal 310 being asserted. For example, the first LED driver 312 supplies power to the first LED output terminal 318 as a result of the first LED enable terminal 310 being asserted. Alternatively, the first LED driver 312 may supply power to the first LED output terminal 318 to cause a segment to produce a light as a result of the first LED enable terminal 310 not being asserted.

The first shunt 316 is electrically coupled to the first LED driver 312, the first shunt enable terminal 314, and the first LED output terminal 318. A shunt output of the first shunt 316 is coupled to the first LED output terminal 318. The first shunt 316 is configured to prevent the first LED driver 312 from supplying power to the first LED output terminal 318 based on the first shunt enable terminal 314. For example, the first shunt 316 prevents power from being supplied to the first LED output as a result of the first shunt enable terminal 314 being asserted. Alternatively, the first shunt 316 may be configured to allow power to be supplied to the first LED output terminal 318 as a result of the first shunt enable terminal 314 being asserted.

In the example of FIG. 3, the second driver 304 includes a second PWM terminal (PWM_2) 320, a second LED enable terminal (LED_EN_2) 322, a second LED driver 324, a second shunt enable terminal (SHUNT_EN_2) 326, a second shunt 328, and a second LED output terminal (LED_OUT_2) 330. The second driver 304 is configured to supply power to one or more segments of a multi-segment illumination source (e.g., the first multi-segment illumination source 202, the second multi-segment illumination source 210, etc.) based on the terminals 320, 322, and 326.

The second LED driver 324 is electrically coupled to the second PWM terminal 320, the second LED enable terminal 322, the second shunt 328, and the second LED output terminal 330. The second PWM terminal 320 may be coupled to a PWM input supplied by the controller 135. An LED driver output of the second LED driver 324 is coupled to the second LED output terminal 330. The second LED driver 324 is configured to determine a magnitude of power to supply to the second LED output terminal 330 based on a duty cycle of the PWM signal electrically coupled to the second PWM terminal 320. For example, the second LED driver 324 may supply 50 percent of the maximum power output to the second LED output terminal 330 as a result of a 50 percent duty cycle on the second PWM terminal 320. The second LED driver 324 is configured to supply power to the second LED output terminal 330 as a result of the second LED enable terminal 322 being asserted. For example, the second LED driver 324 supplies power to the second LED output terminal 330 as a result of the second LED enable terminal 322 being asserted. Alternatively, the second LED driver 324 may supply power to the second LED output terminal 330 to cause a segment to produce a light of a color temperature and brightness as a result of the second LED enable terminal 322 not being asserted.

The second shunt 328 is electrically coupled to the second LED driver 324, the second shunt enable terminal 326, and the second LED output terminal 330. A shunt output of the second shunt 328 is coupled to the second LED output terminal 330. The second shunt 328 is configured to prevent the second LED driver 324 from supplying power to the second LED output terminal 330 based on the second shunt enable terminal 326. For example, the second shunt 328 prevents power from being supplied to the first LED output as a result of the second shunt enable terminal 326 being asserted. Alternatively, the second shunt 328 may allow power to be supplied to the second LED output terminal 330 as a result of the second shunt enable terminal 326 being asserted.

In the example of FIG. 3, the third driver 306 includes a third PWM terminal (PWM_3) 332, a third LED enable terminal (LED_EN_3) 334, a third LED driver 336, a third shunt enable terminal (SHUNT_EN_3) 338, a third shunt 340, and a third LED output terminal (LED_OUT_3) 342. The third driver 306 is configured to supply power to one or more segments of a multi-segment illumination source (e.g., the first multi-segment illumination source 202, the third multi-segment illumination source 218, etc.) based on the terminals 332, 334, and 338.

The third LED driver 336 is electrically coupled to the third PWM terminal 332, the third LED enable terminal 334, the third shunt 340, and the third LED output terminal 342. The third PWM terminal 332 may be coupled to a PWM input supplied by the controller 135. The third LED driver 336 is configured to determine a magnitude of power to supply to the third LED output terminal 342 based on a duty cycle of the PWM signal electrically coupled to the third PWM terminal 332. For example, the third LED driver 336 may supply 50 percent of the maximum power output to the third LED output terminal 342 as a result of a 50 percent duty cycle on the third PWM terminal 332. The third LED driver 336 is configured to supply power to the third LED output terminal 342 as a result of the third LED enable terminal 334 being asserted. For example, the third LED driver 336 supplies power to the third LED output terminal 342 as a result of the third LED enable terminal 334 being asserted. Alternatively, the third LED driver 336 may supply power to the third LED output terminal 342 to cause a segment to produce a light of a color temperature and brightness as a result of the third LED enable terminal 334 not being asserted.

The third shunt 340 is electrically coupled to the third LED driver 336, the third shunt enable terminal 338, and the third LED output terminal 342. A shunt output of the third shunt 340 is coupled to the third LED output terminal 342. The third shunt 340 is configured to prevent the third LED driver 336 from supplying power to the third LED output terminal 342 based on the third shunt enable terminal 338. For example, the third shunt 340 prevents power from being supplied to the first LED output as a result of the third shunt enable terminal 338 being asserted. Alternatively, the third shunt 340 may be configured to allow power to be supplied to the third LED output terminal 342 as a result of the third shunt enable terminal 338 being asserted.

In example of FIG. 3, the driver circuitry 130 is configured to individually drive three LED segments, such as the segments 204-208 of the first multi-segment illumination source 202. Alternatively, the driver circuitry 130 may include more than three drivers to drive more than three segments. The drivers 302-306 may be configured to supply power to a plurality of segments, such as to drive a region (e.g., the regions 244-250 of FIG. 2D). Alternatively, the driver circuitry 130 may be configured to include twelve drivers, such that each of the segments 220-242 of FIGS. 2C and 2D may be individually controlled. Advantageously, the driver circuitry 130 increases the power efficiency of the headlight 105 as a result of being able to individually control each segment of the multi-segment illumination source 125 of FIG. 1. For example, low beam operation of the headlight 105 configured to include the fourth multi-segment illumination source 243 of FIG. 2D is more efficient than a normal illumination source as a result of the controller 135 disabling the third region 248 opposed the spatial light modulator having to reflect the light corresponding to the not illuminated portions to dissipate the light.

Figure 4:
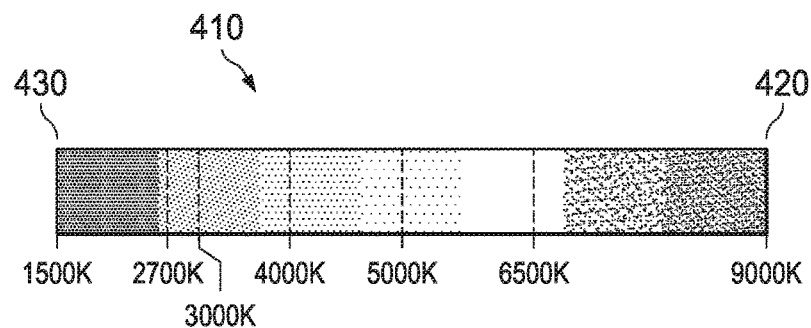
FIG. 4 is an illustration of an example gradient of light temperatures.

FIG. 4 is an illustration of an example gradient of color temperatures 410. The gradient of color temperatures 410 includes an example maximum color temperature 420 and a minimum color temperature 430. The gradient of color temperatures 410 is configured to illustrate the potential color temperatures of an illumination source (e.g., the multi-segment illumination source 125 of FIG. 1).

The maximum color temperature 420 represents light of a color temperature greater than or equal to 9000 Kelvin (K), such that the light has a blue tint. The minimum color temperature 430 represents light of a color temperature less than or equal to 1500 Kelvin (K), such that the light has an orange tint. The gradient of color temperatures 410 illustrates that the lower the color temperature the greater the amount of orange tint applied to the light, such light may be referred to as warm white. The gradient of color temperatures 410 illustrates that the higher the color temperature the greater the amount of blue tint applied to the light, such light may be referred to as bright white. The gradient of color temperature 410 illustrates that the light approximately between 3000 Kelvin and 6500 Kelvin exhibit minimal orange and blue tint, such that the light appears as white.

Figure 5:
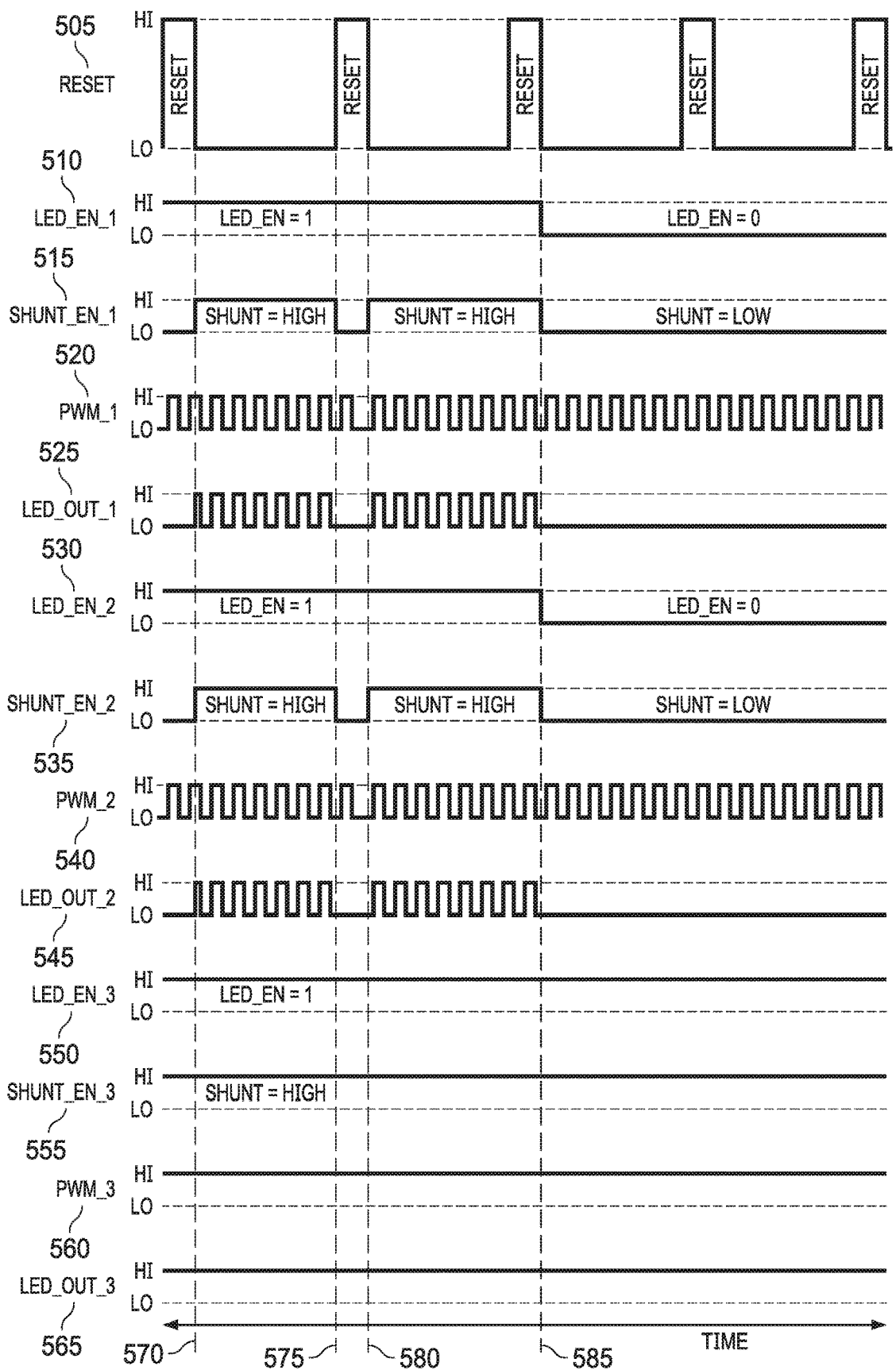
FIG. 5 is a timing diagram of an example operation of the driver circuitry of FIG. 3.

FIG. 5 is a timing diagram of an example operation of the driver circuitry 130 of FIGS. 1 and 3 configured to control the first multi-segment illumination source 202 of FIG. 2A, as well as control of the spatial light modulator 110 of FIG. 1. In the example of FIG. 5, the timing diagram includes an example reset 505, an example first LED enable (LED_EN_1) 510, an example first shunt enable (SHUNT_EN_1) 515, an example first PWM signal (PWM_1) 520, an example first LED output (LED_OUT_1) 525, a second LED enable (LED_EN_2) 530, a second shunt enable (SHUNT_EN_2) 535, a second PWM signal (PWM_2) 540, a second LED output (LED_OUT_2) 545, a third LED enable (LED_EN_3) 550, a third shunt enable (SHUNT_EN_3) 555, a third PWM signal (PWM_3) 560, and a third LED output (LED_OUT_3) 565. The timing diagram is configured to show example operation of the driver circuitry 130 to control the color temperature and intensity of the segments 204-208 of FIG. 2A, such that the color temperature of each of the segments 204-208 are approximately equal. Alternatively, the timing diagram may be configured to include represent the operation of a plurality of regions (e.g., the regions 244-250 of FIG. 2D), such that the color temperature of the regions are approximately equal.

In the example of FIG. 4, the reset 505 is configured to represent a reset operation of the spatial light modulator 110 of FIG. 1. The reset 505 may be configured to represent the reset operation as a logic high (HI). For example, the logic high signal is a signal (e.g., a voltage, a current, etc.) representative of a digital one (e.g., a digital '1,' a logic '1,' or a digital high), such as a voltage of 2.2V, 3.3V, 5V, etc. In some examples, a logic low signal is a signal representative of a digital zero (e.g., a digital '0,' a logic '0,' or a digital low), such as a common potential (e.g., ground). The reset 505 may be configured to represent the reset operation as disabled as a logic low (LO). For example, the spatial light modulator 110 may be configured to load in values stored in memory coupled to the controller 135 of FIG. 1 as a result of the reset 505 being a logic high, such that the spatial light modulator 110 is modified to reflect a mode of operation (e.g., low beam, high beam, or beam steering) when the reset 505 transitions to a logic low. In such an example, the reset 505 may be set to a logic high as a result of the headlight 105 switching between low beam and high beam operation. In such an example, the reset 505 may be configured to represent the spatial light modulator 110 being latched until the reset 505 returns to a logic low, such that the field of view of the headlight 105 may be illuminated as a result of the reset 505 being set to a logic low.

The first LED enable 510 represents the signal at the first LED enable terminal 310 of FIG. 3. The first LED enable 510 may be configured to represent the first LED enable terminal 310 being asserted as a logic high, when LED_EN=1. The first LED enable 510 may be configured to represent the first LED enable terminal 310 being disabled as a logic low when LED_EN=0. For example, the controller 135 of FIG. 1 asserts the first LED enable 510 to enable the first LED driver 312 to supply power to the first LED output terminal 318 of FIG. 3. In such an example, the first LED enable 510 may be deasserted by the controller 135 to disable the first LED driver 312 from supplying power to a segment and/or region.

The first shunt enable 515 represents the signal at the first shunt enable terminal 314 of FIG. 3. The first shunt enable 515 may be configured to represent the first shunt enable terminal 314 being asserted as a logic high, depicted by SHUNT=HIGH, such that the first shunt 316 of FIG. 3 enables the first LED driver 312 to supply power to the first LED output terminal 318. The first shunt enable 515 may be configured to represent the first shunt enable terminal 314 being disabled as a logic low, depicted by SHUNT=LOW, such that the first shunt 316 disables the first driver 302 of FIG. 3. For example, the controller 135 of FIG. 1 may disable a segment of the multi-segment illumination source 125 of FIG. 1 as a result of setting the first shunt enable 515 to a logic low, for example during the time that the reset 505 is applied to the spatial light modulator 110 and during the time the LED enable 510 is deasserted. Alternatively, the first shunt enable 515 may be configured to disable the first driver 302 as a result of a logic high, such that the first shunt enable 515 may enable the first driver 302 as a result of a logic low.

The first PWM signal 520 represents the signal of the first PWM terminal 308 of FIG. 3. The first PWM signal 520 may indicate the current density being supplied to the first LED output terminal 318 based on a duty cycle. For example, the first LED driver 312 supplies approximately 40 percent of the maximum output to the first LED output terminal 318 as a result of the first PWM signal 520 having a 40 percent duty cycle. Additionally, the first PWM signal 520 may be configured to modify the color temperature of a segment. For example, the duty cycle of the first PWM signal 520 may be increased to increase the color temperature and intensity as a result of the increase in the duty cycle increasing the current density supplied by the driver circuitry 130 to the segment and/or region. In some such examples, the color temperature is modified as a result of the increased amount of time, wherein the segment is enabled. Advantageously, the first PWM signal 520 enables the first driver 302 to supply power to a segment of the multi-segment illumination source 125 based on a duty cycle.

The first LED output 525 represents the signal at the first LED output terminal 318. The first LED output 525 may be configured to represent power supplied to a segment of the multi-segment illumination source 125 of FIG. 1. The first LED output 525 may be configured to represent power being supplied to the segment as a logic high. The first LED output 525 may be configured to represent no power being supplied to the segment as a logic low. For example, the first LED output 525 is a logic low as a result of the first LED enable 510 being equal to a logic low, such that the first LED driver 312 is disabled. The first LED output 525 has a duty cycle approximately equal to the duty cycle of the first PWM signal 520, such that the current density of the first LED output 525 may be modified by changing the duty cycle of the first PWM signal. Advantageously, the power supplied by the first driver 302 (illustrated as the first LED output 525) has a duty cycle, such that the color temperature may be modified.

The second LED enable 530 represents the signal at the second LED enable terminal 322 of FIG. 3. The second LED enable 530 may be configured to represent the second LED enable terminal 322 being asserted as a logic high, indicated by LED_EN=1. The second LED enable 530 may be configured to represent the second LED enable terminal 322 being disabled as a logic low, indicated by LED_EN=0. For example, the controller 135 asserts the second LED enable 530 to enable the second LED driver 324 to supply power to the second LED output terminal 330 of FIG. 3.

The second shunt enable 535 represents the value at the second shunt enable terminal 326 of FIG. 3. The second shunt enable 535 may represent the second shunt enable terminal 326 being asserted as a logic high, indicated by SHUNT=HIGH, such that the second shunt 328 of FIG. 3 enables the second LED driver 324 to supply power to the second LED output terminal 330. The second shunt enable 535 may be configured to represent the second shunt enable terminal 326 being disabled as a logic low, indicated by SHUNT=LOW, such that the second shunt 328 disables the second driver 304 of FIG. 3. For example, the controller 135 may disable a segment of the multi-segment illumination source 125 controlled by the second driver 304 as a result of the second shunt enable 535 being set to a logic low. Alternatively, the second shunt enable 535 may be configured to disable the second driver 304 as a result of a logic high, such that the second shunt enable 535 may enable the second driver 304 as a result of a logic low. Advantageously, the first shunt enable 515 and the second shunt enable 535 may be electrically coupled to decrease the integration complexity of the driver circuitry 130. For example, the shunt enables 515 and 535 may be coupled together to allow the controller 135 to disable a plurality of segments comprising a region.

The second PWM signal 540 represents the signal at the second PWM terminal 320 of FIG. 3. The second PWM signal 540 may represent the current density being supplied to the second LED output terminal 330 based on a duty cycle. For example, the second LED driver 324 supplies approximately 40 percent of the maximum output to the second LED output terminal 330 as a result of the second PWM signal 540 having a 40 percent duty cycle. Additionally, the second PWM signal 540 may be configured to modify the color temperature of a segment. For example, the duty cycle of the second PWM signal 540 may be increased to increase the color temperature and intensity. Advantageously, the second PWM signal 540 enables the second driver 304 to supply power to a segment of the multi-segment illumination source 125 based on a duty cycle.

The second LED output 545 represents the signal at the second LED output terminal 330. The second LED output 545 may represent power supplied to a segment of the multi-segment illumination source 125. The second LED output 545 may be configured to represent power being supplied to the segment as a logic high. The second LED output 545 may be configured to represent no power being supplied to the segment as a logic low. For example, the second LED output 545 is a logic low as a result of the second LED enable 530 and/or the second shunt enable 535 being equal to a logic low, such that the second LED driver 324 is disabled. Advantageously, the power supplied by the second driver 304 (illustrated as the second LED output 545) has a duty cycle, such that the color temperature may be modified. For example, increasing the duty cycle of the second LED output 545 increases the color temperature of the light, towards the maximum color temperature 420 of FIG. 4, as a result of the perceived light being altered as the duty cycle of the LED changes. In such an example, the color temperature of a segment is lower, closer to the minimum color temperature 430 of FIG. 4, as a result of the duty cycle of the second PWM signal 540 being lower.

The third LED enable 550 is represents the signal at the third LED enable terminal 334 of FIG. 3. The third LED enable 550 may represent the third LED enable terminal 334 being asserted as a logic high, pictured in FIG. 5. The third LED enable 550 may represent the third LED enable terminal 334 being disabled as a logic low, not pictured in FIG. 5. For example, the controller 135 asserts the third LED enable 550 to enable the third LED driver 336 to supply power to the third LED output terminal 342 of FIG. 3.

The third shunt enable 555 represents the signal at the third shunt enable terminal 338 of FIG. 3. The third shunt enable 555 may be configured to represent the third shunt enable terminal 338 being asserted as a logic high, such that the third shunt 340 of FIG. 3 enables the third LED driver 336 to supply power to the third LED output terminal 342, as pictured in FIG. 5. The third shunt enable 555 may to represent the third shunt enable terminal 338 being disabled as a logic low, such that the third shunt 340 disables the third driver 306 of FIG. 3, not pictured in FIG. 5. For example, the controller 135 may disable a segment of the multi-segment illumination source 125 as a result of setting the third shunt enable 555 to a logic low. Alternatively, the third shunt enable 555 may be configured to disable the third driver 306 as a result of a logic high, such that the third shunt enable 555 may enable the third driver 306 as a result of a logic low.

The third PWM signal 560 represents the third PWM terminal 332 of FIG. 3. The third PWM signal 560 may represent the current density being supplied to the third LED output terminal 342 based on a one hundred percent duty cycle, such that the third PWM signal 560 may be represented by asserting the third PWM terminal 332 of FIG. 3. For example, the third LED driver 336 supplies approximately 40 percent of the maximum output to the third LED output terminal 342 as a result of the third PWM signal 560 having a 40 percent duty cycle. Additionally, the third PWM signal 560 may be configured to modify the color temperature of a segment. For example, the duty cycle of the third PWM signal 560 may be increased to increase the color temperature and intensity. Advantageously, the third PWM signal 560 enables the third driver 306 to supply power to a segment of the multi-segment illumination source 125 based on a duty cycle.

The third LED output 565 represents the third LED output terminal 342. The third LED output 565 may represent power supplied to a segment of the multi-segment illumination source 125. The third LED output 565 may represent power being supplied to the segment as a logic high, as pictured in FIG. 5. The third LED output 565 may be configured to represent no power being supplied to the segment as a logic low, not pictured in FIG. 5. For example, the third LED output 565 is a logic low as a result of the third LED enable 550 being equal to a logic low, such that the third LED driver 336 is disabled. Advantageously, the power supplied by the third driver 306 (illustrated as the third LED output 565) has a one hundred percent duty cycle, such that the color temperature is the closed possible value to the maximum color temperature 420.

At an example first time 570, the reset 505 transitions from a logic high to a logic low, such that the spatial light modulator 110 may no longer be latched in reset and/or loading values from the controller 135. At the first time 570, the first shunt enable 515 transitions from a logic low to a logic high to enable the first driver 302 to supply power to the first LED output terminal 318. At the first time 570, the first LED output 525 is configured to supply power with an approximately 40 percent duty cycle as a result of the first shunt enable 515 and first LED enable 510 being asserted to a logic high and the first PWM signal 520 having a duty cycle approximately equal to 40 percent. At the first time 570, the second LED output 545 is configured to be approximately the same as the first LED output 525, such that the power supplied to the segments corresponding to the drivers 302 and 304 are the same color temperature and intensity.

At a second time 575, the reset 505 transitions from a logic low to a logic high, such that the spatial light modulator 110 is latched in the reset operation. At the second time 575, the shunt enables 515 and 535 transition from a logic high to a logic low as a result of the spatial light modulator 110 being latched in reset operation. At the second time 575, the LED outputs 525 and 545 are a logic low as a result of the shunt enables 515 and 535 being a logic low. Advantageously, the efficiency of the headlight 105 is increased as a result of the drivers 302 and 304 being disabled during the duration where in the reset 505 is a logic high.

At a third time 580, the reset 505 transitions from a logic high to a logic low, such that the spatial light modulator 110 is no longer latched in reset operation. At the third time 580 the operation of the driver circuitry 130 is approximately equal to at the first time 570. Advantageously, the driver circuitry 130 may be coupled be asserted by the controller 135 to represent an LED output with a one hundred percent duty cycle, such that the integration complexity of the headlight 105 is decreased. For example, the third PWM signal 560 is asserted to a logic high to reduce the integration complexity of the third driver 306. In some such examples, the third LED output 565 may remain at a logic high during the durations wherein the reset 505 is asserted to a logic high as a result of the controller 135 determining no transition in the operation of the segment and/or region corresponding to the third LED output 565.

At a fourth time 585, the reset 505 transitions from a logic high to a logic low, such that the spatial light modulator 110 is no longer latched in reset operation. At the fourth time 585, the LED enables 510 and 530 transition from a logic high to a logic low, such that the LED outputs 525 and 545 are set to a logic low. At the fourth time 585, the drivers 302 and 304 do not supply power to the LED output terminals 318 and 330. At the fourth time 585, the third driver 306 remains enabled as a result of the third LED enable 550 and third shunt enable 555 being asserted to a logic high. Advantageously, the headlight 105 is able to control the portions of the field of view being illuminated based on the driver circuitry 130. Advantageously, the headlight 105 is able to individually control the color temperature and intensity of each segment of the multi-segment illumination source 125 based on the PWM signals 520, 540, and 560.

FIG. 5 is a table 600 of example operating parameters of the driver circuitry 130 of FIGS. 1 and 3. In the example of FIG. 5, the table 600 includes an example LED driver current column 605, an example duty cycle column 610, an example illumination column 615, an example color temperature column 620, an example first operation 625, a second operation 630, a third operation 635, a fourth operation 640, and a fifth operation 645. In the example of FIG. 5, the table 600 is configured to represent an optical output of the multi-segment illumination source 125 of FIG. 1 as a result of the electrical outputs of the driver circuitry 130.

The LED driver current column 605 represents the current supplied by the driver circuits (e.g., the drivers 302-306) of FIG. 3), such that the LED outputs 525, 545, and/or 565 of FIG. 4 being asserted to a logic high represent the LED driver current value. For example, the first driver 302 supplies 3 amps (A) as the LED drive current during the duration wherein the first LED output 525 is asserted to a logic high. Alternatively, the LED drivers 312, 324, and 336 may be configured to supply a range of drive current, such that the illumination and color temperature of segments and/or regions may be controlled by modifying the drive current and/or the duty cycle.

The duty cycle column 610 represents the duty cycle of the PWM signals 520, 540, and/or 560. For example, the duty cycle of the first PWM signal 520 is equal to 10 percent as a result of the duration wherein the first PWM signal 520 is asserted to a logic high is 10 percent of the overall duration of the first PWM signal 520.

The illumination column 615 is configured to represent the illumination of a segment (e.g., the segments 202-208 of FIG. 2A, the segments 212-216 of FIG. 2B, the segments 220-242 of FIGS. 2C and 2D, etc.) of the multi-segment illumination source 125 of FIG. 1. The illumination column 615 is configured to represent the illumination of the segment in lumens, such that the intensity of the light increases as the lumens increases.

The color temperature column 620 is configured to represent the color temperature of the light supplied by the segment. The color temperature column 620 is configured to represent the color temperature in kelvin, such that an orange tint increases as the color temperature decreases. Alternatively, the blue tint increases as the color temperature increases.

The first operation 625 represents the first row of the table 600. The first operation 625 represents the operation of the segment (illustrated by columns 615 and 620) based on the operation of the driver circuitry 130 (illustrated by columns 605 and 610). The LED driver current column 605 indicates that the driver circuitry 130 is to supply 3 amps during the first operation 625. The duty cycle column 610 indicates that the duty cycle of the LED output is approximately equal to 10 percent during the first operation 625. The illumination column 615 indicates that the segment is producing an illumination approximately equal to 730 Lumens during the first operation 625. The color temperature column 620 indicates that the segment is producing light of a color temperature approximately equal to 5440 Kelvin (K) during the first operation 625.

The second operation 630 represents the second row of the table 600. The second operation 630 represents the operation of the segment (illustrated by columns 615 and 620) based on the operation of the driver circuitry 130 (illustrated by columns 605 and 610). The LED driver current column 605 is configured to indicate that the driver circuitry 130 is to supply 3 amps during the second operation 630. The duty cycle column 610 is configured to indicate that the duty cycle of the LED output is approximately equal to 30 percent during the second operation 630. The illumination column 615 is configured to indicate that the segment is producing an illumination approximately equal to 1270 Lumens during the second operation 630. The color temperature column 620 is configured to indicate that the segment is producing light of a color temperature approximately equal to 5610 Kelvin (K) during the second operation 630. Advantageously, the illumination and color temperature increased as a result of increasing the duty cycle.

The third operation 635 is configured to represent the third row of the table 600. The third operation 635 is configured to represent the operation of the segment (illustrated by columns 615 and 620) based on the operation of the driver circuitry 130 (illustrated by columns 605 and 610). The LED driver current column 605 is configured to indicate that the driver circuitry 130 is to supply 3 amps during the third operation 635. The duty cycle column 610 is configured to indicate that the duty cycle of the LED output is approximately equal to 60 percent during the third operation 635. The illumination column 615 is configured to indicate that the segment is producing an illumination approximately equal to 2190 Lumens during the third operation 635. The color temperature column 620 is configured to indicate that the segment is producing light of a color temperature approximately equal to 6490 Kelvin (K) during the third operation 635. Advantageously, the illumination and color temperature increased as a result of increasing the duty cycle.

The fourth operation 640 is configured to represent the fourth row of the table 600. The fourth operation 640 is configured to represent the operation of the segment (illustrated by columns 615 and 620) based on the operation of the driver circuitry 130 (illustrated by columns 605 and 610). The LED driver current column 605 is configured to indicate that the driver circuitry 130 is to supply 3 amps during the fourth operation 640. The duty cycle column 610 is configured to indicate that the duty cycle of the LED output is approximately equal to 80 percent during the fourth operation 640. The illumination column 615 is configured to indicate that the segment is producing an illumination approximately equal to 2810 Lumens during the fourth operation 640. The color temperature column 620 is configured to indicate that the segment is producing light of a color temperature approximately equal to 6490 Kelvin (K) during the fourth operation 640. Advantageously, the illumination increased as a result of increasing the duty cycle and the color temperature remained approximately the same, such that the segments brightness can be modified without changing the color temperature.

The fifth operation 645 is configured to represent the fifth row of the table 600. The fifth operation 645 is configured to represent the operation of the segment (illustrated by columns 615 and 620) based on the operation of the driver circuitry 130 (illustrated by columns 605 and 610). The LED driver current column 605 is configured to indicate that the driver circuitry 130 is to supply 3 amps during the fifth operation 645. The duty cycle column 610 is configured to indicate that the duty cycle of the LED output is approximately equal to 100 percent during the fifth operation 645. The illumination column 615 is configured to indicate that the segment is producing an illumination approximately equal to 3300 Lumens during the fifth operation 645. The color temperature column 620 is configured to indicate that the segment is producing light of a color temperature approximately equal to 6490 Kelvin (K) during the fifth operation 645. Advantageously, the illumination increased as a result of increasing the duty cycle and the color temperature remained approximately the same, such that the segments brightness can be modified without changing the color temperature.

FIG. 6B is a table 650 of an operation of the driver circuitry 130 of FIGS. 1 and 3 included in the headlight 105 of FIG. 1. The table 650 includes a LED driver current column 655, a duty cycle column 660, an illumination column 665, a color temperature column 670, a first operation row 675, a second operation row 680, a third operation row 685, a fourth operation row 690, and a fifth operation row 695. The table 650 is configured to represent the operation of traditional driver circuitry to control the illumination and color temperature based on the LED drive current.

The LED drive current column 655 is configured to represent the current supplied by driver circuitry to a headlight. The LED driver current column 655 represents the supplied current in amps (A). The duty cycle column 660 is configured to represent the duty cycle applied to the LED driver circuitry to control the headlight. The duty cycle column 660 is configured to a 100 percent duty cycle to represent a constant voltage. The illumination column 665 is configured to represent the magnitude of light projected by the headlight in Lumens. The color temperature column 670 is configured to represent the color temperature of the light projected by the headlight in Kelvin (K).

The first operation row 675 is configured to represent the operation of the headlight as a result of an LED drive current approximately equal to 1 amp with a 100 percent duty cycle, such that 1 amp is continuously supplied to the headlight. The first operation row 675 illustrates that the illumination of the headlight to be approximately equal to 610 Lumens at a color temperature approximately equal to 5430 Kelvin.

The second operation row 680 is configured to represent the operation of the headlight as a result of an LED drive current approximately equal to 1.5 amps with a 100 percent duty cycle, such that 1.5 amps are continuously supplied to the headlight. The second operation row 680 illustrates that the illumination of the headlight to be approximately equal to 1360 Lumens at a color temperature approximately equal to 5430 Kelvin.

The third operation row 685 is configured to represent the operation of the headlight as a result of an LED drive current approximately equal to 2 amps with a 100 percent duty cycle, such that 2 amps are continuously supplied to the headlight. The third operation row 685 illustrates that the illumination of the headlight to be approximately equal to 2290 Lumens at a color temperature approximately equal to 5440 Kelvin.

The fourth operation row 690 is configured to represent the operation of the headlight as a result of an LED drive current approximately equal to 2.5 amps with a 100 percent duty cycle, such that 2.5 amps are continuously supplied to the headlight. The fourth operation row 690 illustrates that the illumination of the headlight to be approximately equal to 2870 Lumens at a color temperature approximately equal to 6290 Kelvin.

The fifth operation row 695 is configured to represent the operation of the headlight as a result of an LED drive current approximately equal to 3 amps with a 100 percent duty cycle, such that 3 amps are continuously supplied to the headlight. The fifth operation row 695 illustrates that the illumination of the headlight to be approximately equal to 3300 Lumens at a color temperature approximately equal to 6490 Kelvin. Advantageously, the driver circuitry 130 of FIGS. 1 and 3 implement a varying duty cycle to change the current density to enable simple control of the intensity and color temperature of the light projected by the headlight 105.

Figures 7A, 7B:
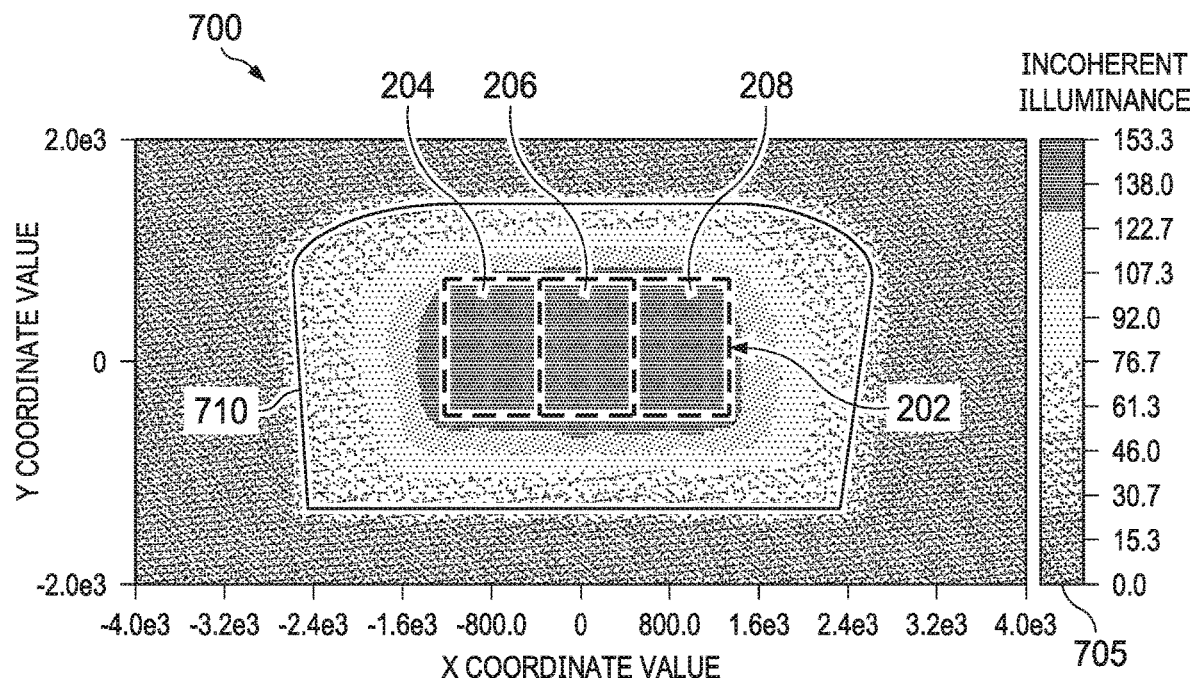
FIG. 7A is an illustration of a first example operation of the first multi-segment illumination source of FIG. 2A.
FIG. 7B is a table of example operating parameters which result in the first operation illustrated in FIG. 7A.

FIG. 7A is an illustration 700 of a first example operation of the headlight 105 of FIG. 1 including the first multi-segment illumination source 202 of FIG. 2A. The illustration 700 represents an area that the headlight 105 illuminates during an example operation, such that the horizontal axis (labeled as X COORDINATE VALUE) represents the horizontal portions of the field of view and the vertical axis (labeled as Y COORDINATE VALUE) represents the vertical portions of the field of view. In the example of FIG. 7A, the illustration 700 includes an area illuminated by the first multi-segment illumination source 202 (labeled to illustrate the area illuminated by each segment), an example incoherent illuminance gradient 705, and an example field of view 710. The illustration 700 is configured to represent the intensity of the illumination of the field of view 710 during an example operation wherein the segments 204-208 (labeled to the corresponding geometric area illuminated by each segment) are being supplied the same amount of power from the driver circuitry 130 of FIG. 1. In the example FIG. 7A, the first operation of the headlight 105 represents an example high beam operation, such that all portions of the field of view are illuminated.

In the example of FIG. 7A, the first multi-segment illumination source 202 includes the first segment 204, the second segment 206, and the third segment 208. The segments 204-208 are configured to individually correspond to approximately a third of the first multi-segment illumination source 202. The first multi-segment illumination source 202 is configured to illuminate the field of view 710, such that the highest intensities of light are limited within the portion of the field of view corresponding to the first multi-segment illumination source 202 reflected by the spatial light modulator 110 of FIG. 1.

The incoherent illuminance gradient 705 is configured to represent a range of possible illuminances of the segments 204-208 in Lumens. The field of view 710 is configured to represent the approximate area wherein the headlight 105 may illuminate. The field of view 710 is based on the projection optics 115. For example, the projection optics 115 may be configured to project the light from the spatial light modulator 110 to illuminate a greater area.

In the example of FIG. 7A, the segments 204-208 are powered by the driver circuitry 130. The portion of the field of view 710 corresponding to the segments 204-208 include the highest intensity, which is approximately the same illuminance throughout the first multi-segment illumination source 202. The portions of the field of view 710 not directly illuminated by the first multi-segment illumination source 202 have an illuminance less than that of the segments 204-208. The headlight 105 is configured to not illuminate the area outside the field of view 710, such that the illuminance is approximately equal to zero. Advantageously, the first multi-segment illumination source 202 illuminates the portions of the field of view 710 uniformly corresponding to the light projected by the spatial light modulator 110.

FIG. 7B is a table 715 of the operation of FIG. 7A representative of the headlight 105 of FIG. 1 including the first multi-segment illumination source 202 of FIG. 2A. In the example of FIG. 7B, the table 715 includes an example left segment column 720, an example center segment column 725, an example right segment column 730, an example total column 735, an example current density row 740, an example power row 745, an example Lumens row 750, and an example 2023 Lumens row 755. In the example of FIG. 6B, the table 715 is configured to represent the operation of the first multi-segment illumination source 200 during an operation illustrated by the illustration 700 of FIG. 7A.

In the example of 7B, the left segment column 720 is configured to represent the operation of the first segment 204 of FIG. 2A of the first multi-segment illumination source 202 during the operation of the illustration 700. The center segment column 725 is configured to represent the operation of the second segment 206 of FIG. 2A of the first multi-segment illumination source 202 during the operation of the illustration 700. The right segment column 730 is configured to represent the operation of the third segment 208 of FIG. 2A of the first multi-segment illumination source 202 during the operation of the illustration 700. The total column 735 is configured to represent the sum of the values comprising the segments 204-208 for the power row 745, the Lumens row 750, and the 2023 Lumens row 755.

In the example of FIG. 7B, the current density row 740 is configured to represent the current density in amps per millimeter squared (A/mm$^2$) of the power supplied to each of the segments 204-208. The current density row 740 is configured to represent both the current and duty cycle of the power supplied by the driver circuitry 130 of FIG. 1. The current density row 740 illustrates that the segments 204-208 are supplied the same current density of approximately 3 amps per millimeter squared, during the operation illustrated by FIG. 7A.

The power row 745 is configured to represent the power consumed by the segments 204-208 during the operation illustrated by FIG. 7A. The power row 745 is configured to represent the power consumed by the segments 204-208 in watts (W). The power row 745 illustrates that the segments 204-208 are configured to each individually consume approximately 16.3 watts of power. The total column 735 illustrates that the total power consumption of the first multi-segment illumination source 202 is approximately equal to 48.9 watts.

The Lumens row 750 is configured to represent the light intensity of the segments 204-208, in Lumens, during the operation illustrated by FIG. 7A. The Lumens row 750 illustrates that each of the segments 204-208 individually supply approximately 975 Lumens of light. The total column 735 illustrates that the total light supplied by the first multi-segment illumination source 200 is approximately equal to 2925 Lumens.

The 2023 Lumens row 755 is configured to represent the light intensity of the segments 204-208, in 2023 Lumens, during the operation illustrated by FIG. 7A. The 2023 Lumens row 755 illustrates that each of the segments 204-208 individually supply approximately 1170 2023 Lumens of light. The total column 735 indicates that the total light supplied by the first multi-segment illumination source 200 is approximately equal to 3510 2023 Lumens.

Figures 8A, 8B:
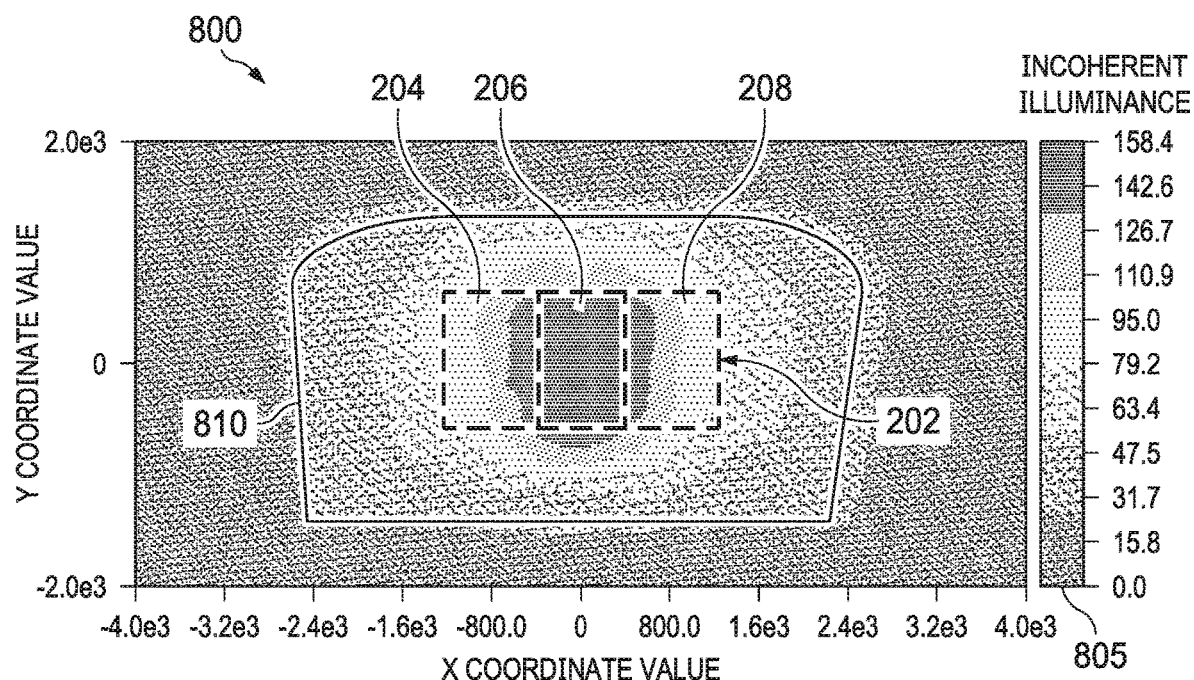
FIG. 8A is an illustration of a second example operation of the first multi-segment illumination source of FIG. 2A.
FIG. 8B is a table of example operating parameters which result in the second operation illustrated in FIG. 8A.

FIG. 8A is an illustration 800 of a second example operation of the headlight 105 of FIG. 1 including the first multi-segment illumination source 202 of FIG. 2A. The illustration 800 represents an area that the headlight 105 illuminates during an example operation, such that the horizontal axis (labeled as X COORDINATE VALUE) represents the horizontal portions of the field of view and the vertical axis (labeled as Y COORDINATE VALUE) represents the vertical portions of the field of view. In the example of FIG. 8A, the illustration 800 includes the first multi-segment illumination source 202 (labeled to illustrate the area illuminated by each segment), an example incoherent illuminance gradient 805, and an example field of view 810. The illustration 800 is configured to represent the intensity of the illumination of the field of view 810 during an example operation wherein the segments 204 and 208 (labeled to the corresponding geometric area illuminated by each segment) are being supplied the same amount of power from the driver circuitry 130 of FIG. 1 and the second segment 206 is supplied more power than the segments 204 and 208. The illustration 800 is configured to represent a beam steering operation, wherein a portion of the field of view is illuminated more than another, such that the spatial light modulator 110 may be configured to project an image in the dimmer portions of the field of view 810. Advantageously, the beam steering operation of FIG. 8A may be configured to enable a spatial light modulator to project an image without having to overcome the light intensity generated by the headlight 105. For example, a DMD may be included in the headlight 105, such that directions may be projected on the road. In such an example, an image projected by the DMD is clearer when the area the image is being projected onto has a lower illumination.

In the example of FIG. 8A, the first multi-segment illumination source 202 includes the first segment 204, the second segment 206, and the third segment 208. The segments 204-208 are configured to individually correspond to approximately a third of the first multi-segment illumination source 202. The first multi-segment illumination source 202 is configured to illuminate the field of view 810, such that the highest intensities of light are limited within the portion of the field of view corresponding to the first multi-segment illumination source 202 reflected by the spatial light modulator 110 of FIG. 1.

The incoherent illuminance gradient 805 is configured to represent a range of possible illuminances of the segments 204-208 in Lumens. The field of view 810 is configured to represent the approximate area wherein the headlight 105 may illuminate. The field of view 810 is based on the projection optics 115. For example, the projection optics 115 may be configured to project the light from the spatial light modulator 110 to illuminate a greater area.

In the example of FIG. 8A, the segments 204-208 are powered by the driver circuitry 130. The portion of the field of view 810 corresponding to the segments 204-208 include the highest intensity. In the example of FIG. 8A, the first multi-segment illumination source 202 is configured to illuminate the center portion of the field of view 810 by supplying more power to the second segment 206 than the segments 204 and 208. The portions of the field of view 810 not directly illuminated by the first multi-segment illumination source 202 have an illuminance less than that of the segments 204-208. The headlight 105 is configured to not illuminate the area outside the field of view 810, such that the illuminance is approximately equal to zero. Advantageously, the portions of the field of view 810 corresponding to the segments 204 and 208 allow for additional circuitry to project images clearly and more efficient than conventional methods. For example, the headlight may be configured to project images corresponding to directions of a cars intended path, such that directions may be displayed to the driver without disrupting a line of sight with the road.

FIG. 8B is a table 815 of the operation of FIG. 8A representative of the headlight 105 of FIG. 1 including the first multi-segment illumination source 202 of FIG. 2A. In the example of FIG. 8B, the table 815 includes an example left segment column 820, an example center segment column 825, an example right segment column 830, an example total column 835, an example current density row 840, an example power row 845, an example Lumens row 850, and an example 2023 Lumens row 855. In the example of FIG. 8B, the table 815 is configured to represent the operation of the first multi-segment illumination source 202 during an operation illustrated by the illustration 800 of FIG. 8A.

In the example of 8B, the left segment column 820 is configured to represent the operation of the first segment 204 of FIG. 2A of the first multi-segment illumination source 202 during the operation of the illustration 800. The center segment column 825 is configured to represent the operation of the second segment 206 of FIG. 2A of the first multi-segment illumination source 202 during the operation of the illustration 800. The right segment column 830 is configured to represent the operation of the third segment 208 of FIG. 2A of the first multi-segment illumination source 202 during the operation of the illustration 800. The total column 835 is configured to represent the sum of the values comprising the segments 204-208 for the power row 845, the Lumens row 850, and the 2023 Lumens row 855.

In the example of FIG. 8B, the current density row 840 is configured to represent the current density in amps per millimeter squared (A/mm²) of the power supplied to each of the segments 204-208. The current density row 840 is configured to represent both the current and duty cycle of the power supplied by the driver circuitry 130 of FIG. 1. The current density row 840 illustrates that the segments 204 and 208 are supplied the same current density of approximately 1 amp per millimeter squared, during the operation illustrated by FIG. 8A. The current density row 840 illustrates that the second segment 206 is supplied a current density approximately equal to 5 amps per millimeter squared.

The power row 845 is configured to represent the power consumed by the segments 204-208 during the operation illustrated by FIG. 8A. The power row 845 is configured to represent the power consumed by the segments 204-208 in watts (W). The power row 845 illustrates that the segments 204 and 208 are configured to each individually consume approximately 4.8 watts of power. The power row 845 illustrates that the second segment 206, corresponding to the center segment column 825, is configured to consume approximately 29.6 watts. The total column 835 indicates that the total power consumption of the first multi-segment illumination source 202 is approximately equal to 35.2 watts during the operation illustrated by FIG. 8A.

The Lumens row 850 is configured to represent the light intensity of the segments 204-208, in Lumens, during the operation illustrated by FIG. 8A. The Lumens row 850 illustrates that each of the segments 204 and 208 individually supply approximately 614 Lumens of light. The Lumens row 850 illustrates that the second segment 206 is configured to supply approximately 1120 Lumens of light. The total column 835 indicates that the total light supplied by the first multi-segment illumination source 200 is approximately equal to 2148 Lumens during the operation illustrated by FIG. 8A.

The 2023 Lumens row 855 is configured to represent the light intensity of the segments 204-208, in 2023 Lumens, during the operation illustrated by FIG. 8A. The 2023 Lumens row 855 illustrates that each of the segments 204 and 208 individually supply approximately 617 2023 Lumens of light. The 2023 Lumens row 855 illustrates that the second segment 206 is configured to supply 1344 2023 Lumens of light. The total column 835 indicates that the total light supplied by the first multi-segment illumination source 200 is approximately equal to 2578 2023 Lumens during the operation illustrated by FIG. 8A.

Advantageously, the headlight 105 may configure the multi-segment illumination source 125 to beam steer the light supplied to the spatial light modulator 110, such that the efficiency of the headlight 105 is increased. For example, a conventional headlight may cover or reflect light to make portions of the field of view appear to be illuminated less than other portions.

Figures 9A, 9B:
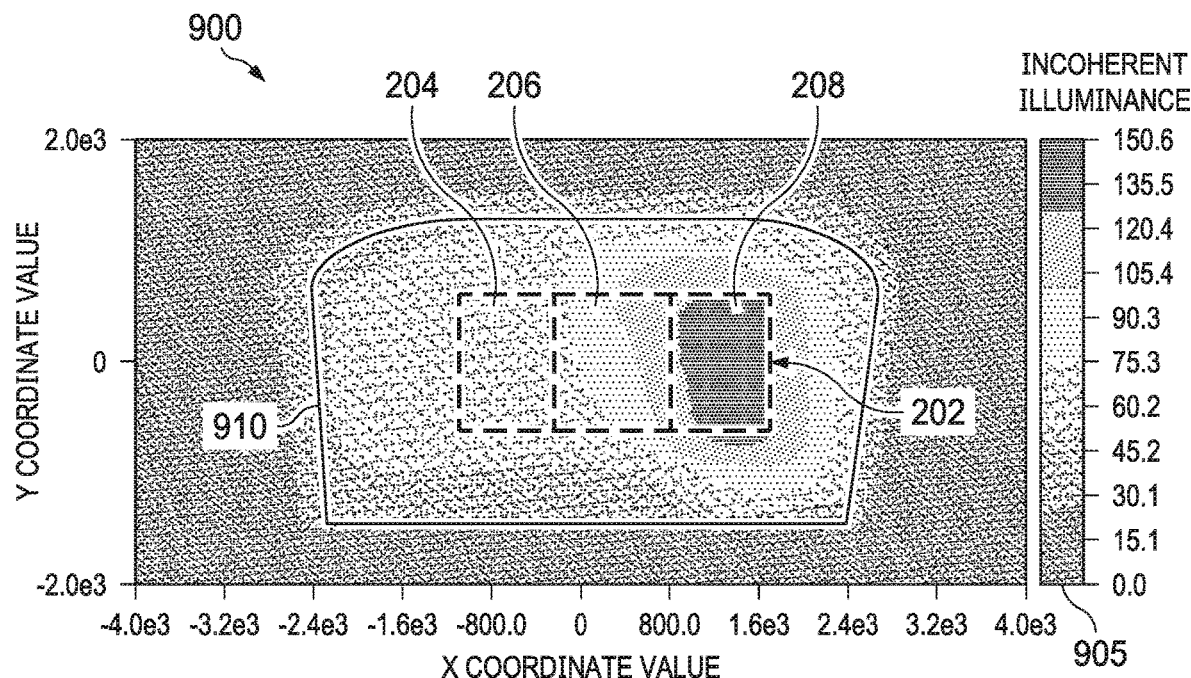
FIG. 9A is an illustration of a third example operation of the first multi-segment illumination source of FIG. 2A.
FIG. 9B is a table of example operating parameters which result in the third operation illustrated in FIG. 9A.

FIG. 9A is an illustration 900 of a third example operation of the headlight 105 of FIG. 1 including the first multi-segment illumination source 202 of FIG. 2A. The illustration 900 represents an area that the headlight 105 illuminates during an example operation, such that the horizontal axis (labeled as X COORDINATE VALUE) represents the horizontal portions of the field of view and the vertical axis (labeled as Y COORDINATE VALUE) represents the vertical portions of the field of view. In the example of FIG. 9A, the illustration 900 includes the first multi-segment illumination source 202 (labeled to illustrate the area illuminated by each segment), an example incoherent illuminance gradient 905, and an example field of view 910. The illustration 900 is configured to represent the intensity of the illumination of the field of view 910 during an example operation wherein the segments 204 and 206 (labeled to the corresponding geometric area illuminated by each segment) are being supplied the same amount of power from the driver circuitry 130 of FIG. 1 and the third segment 208 is supplied more power than the segments 204 and 206. The illustration 900 is configured to represent a beam steering operation, wherein a portion of the field of view is illuminated more than another, such that the spatial light modulator 110 may be configured to project an image in the dimmer portions of the field of view 910. For example, the headlight 105 include a DMD to project directions onto the road, such that an arrow may be projected to indicate a turn. In such an example, the DMD may be configured to project a hazard indication in the portions of the field of view corresponding to the segments 204 and 206, such that the hazard may still be illuminated by the third segment 208.

In the example of FIG. 9A, the first multi-segment illumination source 202 includes the first segment 204, the second segment 206, and the third segment 208. The segments 204-208 are configured to individually correspond to approximately a third of the first multi-segment illumination source 202. The first multi-segment illumination source 202 is configured to illuminate the field of view 910, such that the highest intensities of light are limited within the portion of the field of view corresponding to the first multi-segment illumination source 202 reflected by the spatial light modulator 110 of FIG. 1.

The incoherent illuminance gradient 905 is configured to represent a range of possible illuminances of the segments 204-208 in Lumens. The field of view 910 is configured to represent the approximate area wherein the headlight 105 may illuminate. The field of view 910 is based on the projection optics 115. For example, the projection optics 115 may be configured to project the light from the spatial light modulator 110 to illuminate a greater area.

In the example of FIG. 9A, the segments 204-208 are powered by the driver circuitry 130. The portion of the field of view 910 corresponding to the segments 204-208 include the highest intensity. In the example of FIG. 9A, the first multi-segment illumination source 202 is configured to illuminate the right portion of the field of view 910 by supplying more power to the third segment 208 than the segments 204 and 206. The portions of the field of view 910 not directly illuminated by the first multi-segment illumination source 202 have an illuminance less than that of the segments 204-208. The headlight 105 is configured to not illuminate the area outside the field of view 910 to prevent illuminating areas that may generate potential hazards, such that the illuminance is approximately equal to zero. Advantageously, the portions of the field of view 910 corresponding to the segments 204 and 206 allow for additional circuitry to project images clearly and more efficient than conventional methods.

FIG. 9B is a table 915 of the operation of FIG. 9A representative of the headlight 105 of FIG. 1 including the first multi-segment illumination source 202 of FIG. 2A. In the example of FIG. 9B, the table 915 includes an example left segment column 920, an example center segment column 925, an example right segment column 930, an example total column 935, an example current density row 940, an example power row 945, an example Lumens row 950, and an example 2023 Lumens row 955. In the example of FIG. 9B, the table 915 is configured to represent the operation of the first multi-segment illumination source 202 during an operation illustrated by the illustration 900 of FIG. 9A.

In the example of FIG. 9B, the left segment column 920 is configured to represent the operation of the first segment 204 of FIG. 2A of the first multi-segment illumination source 202 during the operation of the illustration 900. The center segment column 925 is configured to represent the operation of the second segment 206 of FIG. 2A of the first multi-segment illumination source 202 during the operation of the illustration 900. The right segment column 930 is configured to represent the operation of the third segment 208 of FIG. 2A of the first multi-segment illumination source 202 during the operation of the illustration 900. The total column 935 is configured to represent the sum of the values comprising the segments 204-208 for the power row 945, the Lumens row 950, and the 2023 Lumens row 955.

In the example of FIG. 9B, the current density row 940 is configured to represent the current density in amps per millimeter squared (A/mm$^2$) of the power supplied to each of the segments 204-208. The current density row 940 is configured to represent both the current and duty cycle of the power supplied by the driver circuitry 130 of FIG. 1. The current density row 940 illustrates that the segments 204 and 206 are supplied the same current density of approximately 1 amp per millimeter squared, during the operation illustrated by FIG. 9A. The current density row 940 illustrates that the third segment 208 is supplied a current density approximately equal to 5 amps per millimeter squared.

The power row 945 is configured to represent the power consumed by the segments 204-208 during the operation illustrated by FIG. 9A. The power row 945 is configured to represent the power consumed by the segments 204-208 in watts (W). The power row 945 illustrates that the segments 204 and 206 are configured to each individually consume approximately 4.8 watts of power. The power row 945 illustrates that the third segment 208, corresponding to the right segment column 930, is configured to consume approximately 29.6 watts. The total column 935 indicates that the total power consumption of the first multi-segment illumination source 200 is approximately equal to 35.2 watts during the operation illustrated by FIG. 9A.

The Lumens row 950 is configured to represent the light intensity of the segments 204-208, in Lumens, during the operation illustrated by FIG. 9A. The Lumens row 950 illustrates that each of the segments 204 and 206 individually supply approximately 614 Lumens of light. The Lumens row 950 illustrates that the third segment 208 is configured to supply approximately 1120 Lumens of light. The total column 935 indicates that the total light supplied by the first multi-segment illumination source 200 is approximately equal to 2148 Lumens during the operation illustrated by FIG. 9A.

The 2023 Lumens row 955 is configured to represent the light intensity of the segments 204-208, in 2023 Lumens, during the operation illustrated by FIG. 9A. The 2023 Lumens row 955 illustrates that each of the segments 204 and 206 individually supply approximately 617 2023 Lumens of light. The 2023 Lumens row 955 illustrates that the third segment 208 is configured to supply 1344 2023 Lumens of light. The total column 935 indicates that the total light supplied by the first multi-segment illumination source 202 is approximately equal to 2578 2023 Lumens during the operation illustrated by FIG. 9A.

Advantageously, the headlight 105 may configure the multi-segment illumination source 125 to beam steer the light supplied to the spatial light modulator 110, such that the efficiency of the headlight 105 is increased. For example, the controller 135 may configure the driver circuitry 130 to decrease the power supplied to segments of the multi-segment illumination source, such that portions of the field of view of the headlight 105 are dimmer than other portions to enable different operations of the headlight 105 (e.g., image projection). In some such examples, the efficiency of the headlight 105 is increased as a result of lowering the intensities of some segments without having to dissipate light.

Figure 10:
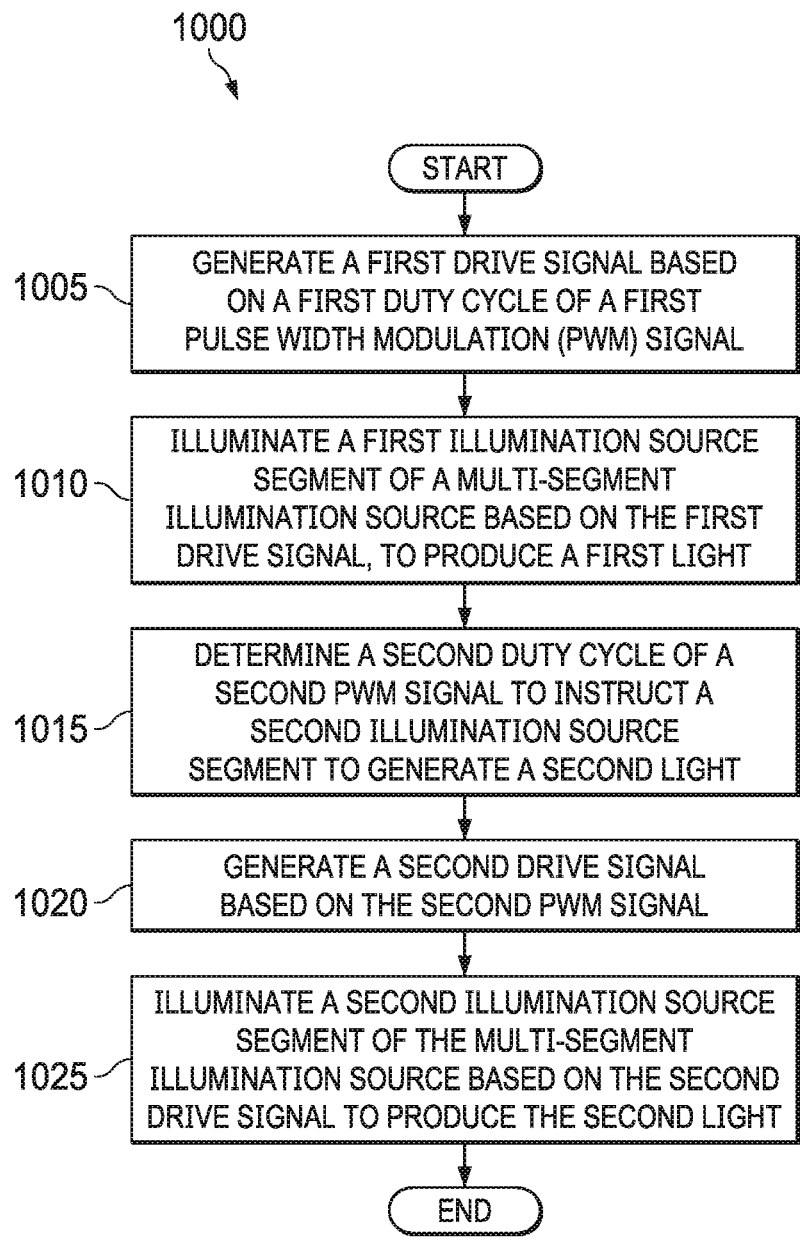
FIG. 10 is a flowchart representative of example machine readable instructions and/or example operations that may be executed by example processor circuitry to implement color temperature correction using the driver circuitry of FIG. 3.

FIG. 10 is a flowchart 1000 representative of example machine readable instructions and/or example operations that may be executed by example processor circuitry to implement color temperature correction using the driver circuitry 130 of FIGS. 1 and 3. In the example of FIG. 10, the flowchart 1000 represents an operation that may be implemented by the controller 135 of FIG. 1 to configure the driver circuitry 130 to supply power to segments (e.g., the segments 204-208, 212-216, and 220-242) of a multi-segment illumination source (e.g., the multi-segment illumination sources 202, 210, 218, and 243), such that each segment comprising the multi-segment illumination source supplies light with approximately the same color temperature (e.g., the values of the color temperature columns 620 and 670 of FIGS. 6A and 6B).

At block 1005, the driver circuitry 130 generates a first drive signal based on a first duty cycle of a first pulse width modulation (PWM) signal. For example, the controller 135 supplies the first PWM signal 520 of FIG. 5 to the first PWM terminal 308 of FIG. 3 to generate the first LED output 525 of FIG. 5. In such an example, the duty cycle of the first PWM signal 520 may generate a color temperature similar to the operations 625-645 of FIG. 6A. Advantageously, the controller 135 may determine the color temperature generated by the first duty cycle. The controller 135 proceeds to block 1010.

At block 1010, the controller 135 illuminates a first illumination source segment of a multi-segment illumination source based on the first drive signal to produce a first light. For example, the first LED output 525 is coupled to the first segment 204 of FIG. 2A to generate a light of a color temperature and a brightness. In such an example, the controller 135 may determine the color temperature and brightness of the first segment 204 based on the duty cycle supplied to the first PWM terminal 308. The controller 135 proceeds to block 1015.

At block 1015, the controller 135 determines a second duty cycle of a second PWM signal to instruct a second illumination source segment to generate a second light. For example, the controller 135 generates a duty cycle of the second PWM signal 540 of FIG. 5 to the second PWM terminal 320 of FIG. 3 based on the color temperature generated by supplying the first LED output 525 to the first segment 204. Advantageously, the controller 135 may utilize the operation of rows 625-645 of FIG. 6A and 675-695 of FIG. 6B to determine a duty cycle which would generate the same color temperature. The controller 135 proceeds to block 1020.

At block 1020, the controller 135 generates a second drive signal based on the second PWM signal. For example, the controller 135 supplies the second PWM signal 540 to the second PWM terminal 320 to generate the second LED output 545, such that the second segment 206 of FIG. 2A generates a light with a color temperature approximately equal to the color temperature of the first segment 204. The controller 135 proceeds to block 1025.

At block 1025, the driver circuitry 130 illuminates a second illumination source segment of the multi-segment illumination source based on the second drive signal to produce the second light. For example, the second driver 304 supplies the second LED output 545 to the second segment 206, such that the second segment 206 produces a light of a color temperature approximately equal to the color temperature of the first light. The controller 135 proceeds to end the color temperature correction of the flowchart 1000.

Although example methods are described with reference to the flowchart 1000 illustrated in FIG. 10, many other methods of color temperature correction may alternatively be used in accordance with the in accordance with this description. For example, the order of execution of the blocks may be changed, and/or some of the blocks described may be changed, eliminated, or combined. Similarly, additional operations may be included in the manufacturing process before, in between, or after the blocks shown in the illustrated examples.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors are described herein, other transistors (or equivalent devices) may be used instead. For example, a p-type metal-oxide-silicon FET ("MOSFET") may be used in place of an n-type MOSFET with little or no changes to the circuit. Furthermore, other types of transistors may be used (such as bipolar junction transistors (BJTs)).

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value.

Modifications are possible in the described embodiments, and other embodiments are possible, within the scope of the claims.

What is claimed is:

1. A headlight comprising:
   a multi-segment illumination source comprising:
      a first illumination source segment; and
      a second illumination source segment;
   driver circuitry coupled to the multi-segment illumination source, the driver circuitry comprising:
      a first driver coupled to the first illumination source segment, the first driver configured to generate a first drive signal to cause the first illumination source segment to produce a first light having a first brightness; and
      a second driver coupled to the second illumination source segment, the second driver configured to generate a second drive signal to cause the second illumination source segment to produce a second light having a second brightness; and
   a spatial light modulator (SLM) optically coupled to the multi-segment illumination source, the SLM configured to:
      receive the first light;
      modulate the first light to produce first modulated light;
      receive the second light; and
      modulate the second light to produce second modulated light.

2. The headlight of claim 1, wherein the first drive signal is a first pulse width modulation signal, and the second drive signal is a second pulse width modulation signal.

3. The headlight of claim 2, further comprising a controller coupled to the driver circuitry and to the SLM, the controller configured to:
   determine a duty cycle of the first pulse width modulation signal to instruct the first driver to instruct the first illumination source segment to produce the first light to have a brightness and a color temperature; and
   instruct the SLM to modulate the first light and the second light.

4. The headlight of claim 2, wherein the multi-segment illumination source further comprises a third illumination source segment, the headlight further comprises a third driver coupled to the third illumination source segment, the third driver configured to generate a third drive signal to cause the third illumination source segment to produce third light having a third brightness, and wherein the SLM is further configured to:
   receive the third light; and
   modulate the third light to produce third modulated light.

5. The headlight of claim 4, wherein the multi-segment illumination source further comprises a fourth illumination source segment, the headlight further comprising a fourth driver coupled to the fourth illumination source segment, the fourth driver configured to generate a fourth drive signal to cause the fourth illumination source segment to produce fourth light having a fourth brightness, and wherein the SLM is further configured to:
   receive the fourth light; and
   modulate the fourth light to produce fourth light.

6. The headlight of claim 5, wherein the first illumination source segment is a left vertical segment, the second illumination source segment is a right vertical segment, the third illumination source segment is a top center horizontal segment, and the fourth illumination source segment is a bottom center horizontal segment.

7. The headlight of claim 1, wherein the first brightness is different than the second brightness.

8. The headlight of claim 1, wherein the first driver includes a shunt configured to disable the first illumination source segment.

9. The headlight of claim 1, wherein the first driver comprises:
   a light emitting diode (LED) driver having a pulse width modulation (PWM) input, an LED enable input, and an LED driver output; and
   a shunt having a shunt enable input and a shunt output, the shunt output coupled to the LED driver output.

10. The headlight of claim 1, wherein the first illumination source segment and the second illumination source segment are vertical segments.

11. The headlight of claim 1, wherein the first illumination source segment and the second illumination source segment are horizontal segments.

12. A method comprising:
    generating, by a first driver, a first drive signal based on a first duty cycle of a first pulse width modulation (PWM) signal;
    illuminating a first illumination source segment of a multi-segment illumination source based on the first drive signal, to produce a first light having a first brightness and a first color temperature;
    determining, by a controller, a second duty cycle of a second PWM signal to instruct a second illumination source segment to generate a second light having a second color temperature and a second brightness, wherein the second color temperature is the same as the first color temperature and the second brightness is different than the first brightness;
    generating, by a second driver, a second drive signal based on the second PWM signal; and
    illuminating a second illumination source segment of the multi-segment illumination source based on the second drive signal, to produce second light having the second brightness and the second color temperature.

13. The method of claim 12, further comprising:
    generating, by a third driver, a third drive signal based on a third PWM signal; and
    illuminating a third illumination source segment of the multi-segment illumination source based on the third drive signal.

14. The method of claim 12, further comprising controlling a shunt of the first driver to disable the first illumination source segment.

15. The method of claim 12, further comprising instructing, by the controller, a spatial light modulator to modulate the first light and the second illumination source segment.

16. A vehicle comprising:
    a headlight comprising:
        a first light emitting diode (LED) segment;
        a second LED segment;

a first driver coupled to the first LED segment, the first driver configured to produce a first drive signal to instruct the first LED segment to produce first light;

a second driver coupled to the second LED segment, the second driver configured to produce a second drive signal to instruct the second LED segment to produce second light;

a spatial light modulator (SLM) optically coupled to the first LED segment and to the second LED segment; and a controller coupled to the first driver, to the second driver, and to the SLM, the controller configured to:
instruct the first driver to cause the first light to have a first brightness and a first color temperature;
instruct the second driver to cause the second light to have a second brightness and a second color temperature; and
control the SLM to modulate the first light and the second light to produce modulated light.

17. The vehicle of claim 16, wherein the vehicle further comprises:
a third LED segment; and
a third driver coupled to the third LED segment and to the controller, the third LED segment configured to produce a third drive signal to instruct the third LED segment to produce third light, and wherein the controller is further configured to control the SLM to modulate the third light.

18. The vehicle of claim 17, further comprising:
a fourth LED segment;
a fourth driver coupled to the fourth LED segment, the fourth driver configured to generate a fourth drive signal to instruct the fourth LED segment to produce fourth light having a fourth brightness, and wherein the SLM is further configured to:
receive the fourth light; and
modulate the fourth light to produce fourth light, wherein the LED segment is a left vertical segment, the second LED segment is a right vertical segment, the third LED segment is a top center horizontal segment, and the fourth LED segment is a bottom center horizontal segment.

19. The vehicle of claim 18, further comprising a projection lens optically coupled to the SLM, the projection lens configured to project the modulated light.

20. The vehicle of claim 18, wherein the first brightness is different than the second brightness.

* * * * *